(12) United States Patent
Tsiaflakis et al.

(10) Patent No.: US 10,992,341 B2
(45) Date of Patent: Apr. 27, 2021

(54) LOW-COMPLEXITY BEAMFORMING FOR A MULTI-LINE COMMUNICATION SYSTEM

(71) Applicant: Nokia Solutions and Networks OY, Espoo (FI)

(72) Inventors: Paschalis Tsiaflakis, Schriek (BE); Jochen Maes, Antwerp (BE); Werner Coomans, Zellik (BE); Carl Nuzman, Union, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/442,952

(22) Filed: Jun. 17, 2019

(65) Prior Publication Data

US 2020/0395979 A1 Dec. 17, 2020

(51) Int. Cl.
*H04B 3/487* (2015.01)
*H04B 3/32* (2006.01)
(Continued)

(52) U.S. Cl.
CPC ............... *H04B 3/04* (2013.01); *H04B 3/32* (2013.01); *H04B 3/487* (2015.01); *H04B 3/542* (2013.01);
(Continued)

(58) Field of Classification Search
CPC ............. H04L 25/03343; H04L 1/06; H04L 2025/03414; H04L 27/2601;
(Continued)

(56) References Cited

U.S. PATENT DOCUMENTS

2009/0201997 A1\* 8/2009 Kim ................... H04N 21/2383
375/240.25
2009/0252247 A1\* 10/2009 Lee ....................... H04B 7/0626
375/267
(Continued)

FOREIGN PATENT DOCUMENTS

EP 3301820 A1 4/2018

OTHER PUBLICATIONS

SG15-C1044, "G.mgfast: On the trade-off between resource saving and FDMA update speed for G.mgfast P2MP transmission across homes", by Nokia Corporation, Oct. 2018, Geneva.
(Continued)

*Primary Examiner* — Linda Wong
(74) *Attorney, Agent, or Firm* — Mendelsohn Dunleavy, P.C.; Yuri Gruzdkov

(57) ABSTRACT

A multi-line digital transceiver configured to use low-complexity beamforming on at least some tones to boost effective SNR values for selected subscriber lines. In an example embodiment, the beamforming coefficients can be restricted to one-bit values or two-bit values, e.g., such that the corresponding beamforming computations can be implemented using only sign changes, swaps of the real and imaginary parts, and/or zeroing of some values, and without invoking any full-precision hardware multiplication operations. At least some embodiments can be run on a significantly simpler and/or less powerful vectoring engine than conventional beamforming solutions while still being able to provide nearly optimal beamforming SNR gains. In some embodiments, additional scaling by powers of two may be applied to at least some signals contributing to the beamforming, e.g., to satisfy power constraints for some or all of the subscriber lines.

26 Claims, 14 Drawing Sheets

(51) Int. Cl.
*H04J 11/00* (2006.01)
*H04L 5/00* (2006.01)
*H04J 1/00* (2006.01)
*H04B 3/04* (2006.01)
*H04B 3/54* (2006.01)

(52) U.S. Cl.
CPC .............. *H04J 1/00* (2013.01); *H04J 11/0023* (2013.01); *H04J 11/0033* (2013.01); *H04L 5/0007* (2013.01)

(58) Field of Classification Search
CPC .............. H04L 27/2647; H04L 27/362; H04L 1/0041; H04L 1/0045; H04L 5/0023; H04L 27/36; H04L 25/0222; H04L 27/20; H04L 27/2649; H04L 27/368; H04L 27/2627; H04L 27/38; H04L 1/20; H04L 27/2602; H04L 1/0625; H04L 1/0631; H04L 27/12; H04L 27/14; H04L 1/0618; H04L 5/0005; H04L 1/1829; H04L 1/1867; H04L 27/2626; H04L 1/0042; H04L 5/0046; H04L 1/0075; H04L 2025/03426; H04B 3/32; H04B 7/0452; H04B 3/487; H04B 7/0413; H04B 1/06; H04B 1/16; H04B 7/0842; H04B 7/0848; H04B 7/0456; H04B 7/0617; H04B 7/0697; H04B 7/08; H04B 7/0482; H04B 7/06; H04W 72/042; H04W 72/0413
See application file for complete search history.

(56) References Cited

U.S. PATENT DOCUMENTS

| 2014/0219074 | A1 | 8/2014 | Lu et al. |
| 2016/0112091 | A1* | 4/2016 | Chu ................... H04B 3/32 375/285 |
| 2017/0318150 | A1* | 11/2017 | Tsiaflakis ................ H04L 1/201 |
| 2018/0083815 | A1 | 3/2018 | Humphrey et al. |
| 2018/0316386 | A1* | 11/2018 | Verbin .................. H04B 7/005 |
| 2019/0007106 | A1* | 1/2019 | Park ..................... H04B 7/0626 |
| 2020/0028660 | A1* | 1/2020 | Al Rawi ............. H04M 11/062 |
| 2020/0028972 | A1* | 1/2020 | Al Rawi ............. H04L 5/0007 |
| 2020/0228161 | A1* | 7/2020 | Tsiaflakis ................ H04B 3/32 |

OTHER PUBLICATIONS

Tsiaflakis, Paschalis et al., U.S. Appl. No. 16/246,989, "Use of Vectoring and Time- and/or Frequency-Division Multiple Access in a Multi-User Connection", filed Jan. 14, 2019 (990.0916).
Stojkovic, Nino. "ADSL Analog Front End." Automatika-Zagreb-47.1/2 (2006): pp. 59-67.
Wang, Zihuan, et al. "Hybrid Precoder and Combiner Design with Low Resolution Phase Shifters in mmWave MIMO Systems." arXiv preprint arXiv:1710.06192 (2017).
Castañeda, Oscar, et al. "1-bit Massive MU-MIMO Precoding in VLSI." arXiv preprint arXiv:1702.03449 (2017).
Sohrabi, Foad, et al. "One-Bit Precoding and Constellation Range Design for Massive MIMO with QAM Signaling." arXiv preprint arXiv:1802.04206 (2018).
ITU Q4/15-C27 (180423), "G.fast: Framework for Multi-line Rate Objectives (MRO)" by Nokia Corporation, Apr. 2018, Shanghai, China.
Extended European Search Report for corresponding European application No. 20180585.0; dated Sep. 23, 2020 (10 pages).

* cited by examiner

100

200

170

160

1300

1400

LOW-COMPLEXITY BEAMFORMING FOR A MULTI-LINE COMMUNICATION SYSTEM

BACKGROUND

Field

Various example embodiments relate to communication equipment and, more specifically but not exclusively, to methods and apparatus for transmitting and/or receiving communication signals using beamforming.

Description of the Related Art

This section introduces aspects that may help facilitate a better understanding of the disclosure. Accordingly, the statements of this section are to be read in this light and are not to be understood as admissions about what is in the prior art or what is not in the prior art.

Frequency-division multiplexing (FDM) is a method of transmitting data on multiple carrier frequencies that can be used in wireline, wireless, and optical communication channels. Different variants of FDM are used in various forms of wideband digital communications, digital television, audio broadcasting, digital subscriber line (DSL) or G.fast/G.mgfast Internet access, local area networks (LANs), home networks, 4G or 5G mobile-access networks, etc. Some variants of FDM, typically collectively referred to as discrete multi-tone (DMT) modulation, are used in wireline communication channels established over, e.g., plain old telephone service (POTS) copper wiring, coaxial cable, and/or power lines. Some FDM schemes use orthogonal frequency-division multiplexing (OFDM).

SUMMARY OF SOME SPECIFIC EMBODIMENTS

Disclosed herein are various embodiments of a multi-line digital transceiver configured to use low-complexity beamforming on at least some tones to boost effective signal-to-noise ratio (SNR) values for selected subscriber lines. In an example embodiment, the beamforming coefficients can be restricted to one-bit values or two-bit values, e.g., such that the corresponding beamforming computations can be implemented primarily using sign changes, swaps of the real and imaginary parts, and/or zeroing of some values, and without invoking any full-precision hardware multiplication operations. At least some embodiments can be run on a significantly simpler and/or less powerful vectoring engine than conventional beamforming solutions while still being able to provide nearly optimal beamforming SNR gains.

In some embodiments, additional scaling by powers of two may be applied to at least some signals contributing to the beamforming, e.g., to satisfy power constraints for some or all of the subscriber lines.

In some embodiments, the relaxed requirements to the vectoring engine can advantageously be used to achieve significant component-cost savings and other related benefits.

According to an example embodiment, provided is an apparatus comprising a data transmitter that comprises an analog front end connectable to proximal ends of a plurality of subscriber lines and a digital signal processor configured to drive the analog front end to cause a plurality of output signals to be transmitted on the subscriber lines using frequency-division multiplexing; wherein the digital signal processor comprises a vector processor configured to: for a first tone, generate a plurality of first precoded data signals by applying a plurality of weighting factors to a value being communicated to a data receiver at a distal end of a selected one of the subscriber lines; and drive the analog front end to apply each of the first precoded data signals to a respective one of the subscriber lines; wherein the first precoded data signals that are applied to the subscriber lines other than the selected one of the subscriber lines are coupled to the selected one of the subscriber lines by way of interline crosstalk on the first tone; wherein the weighting factors are selected such as to cause constructive interference of the first precoded data signals received by the data receiver, each of the weighting factors being represented by a one-bit value, a two-bit value, or a three-bit value.

According to another example embodiment, provided is an apparatus comprising a data receiver that comprises an analog front end and a digital signal processor configured to process digital samples corresponding to a plurality of input signals received by the analog front end at input ports connectable to proximal ends of a corresponding plurality of subscriber lines, the input signals being received in response to data signals applied to distal ends of the subscriber lines, the data signals having been encoded with data using frequency-division multiplexing; wherein the digital signal processor comprises a vector processor configured to generate, for a first tone, an output value by computing a weighted sum of input values, each of the input values corresponding to the first tone of a respective one of the input signals, the weighted sum being computed using a plurality of weighting factors, the first tones of the input signals being received in response to a single one of the data signals, the single one of the data signals having been coupled to multiple ones of the subscriber lines by way of interline crosstalk on the first tone; and wherein the weighting factors are selected such as to cause addends of the weighted sum to add substantially constructively, each of the weighting factors being represented by a one-bit value, a two-bit value, or a three-bit value.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
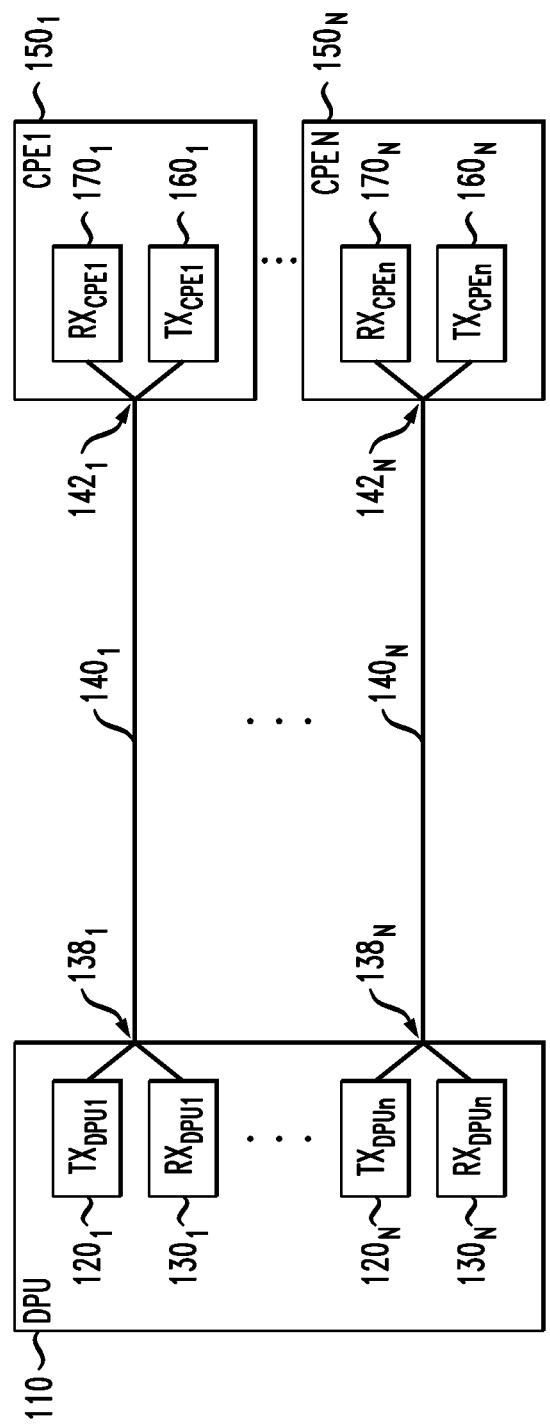
FIG. 1 shows a block diagram of an example communication system in which some embodiments can be practiced.

Some embodiments disclosed herein may benefit from the use of at least some features disclosed in U.S. patent application Ser. No. 16/246,989, which is incorporated herein by reference in its entirety.

The following acronyms/abbreviations are used in the description of various embodiments and/or in the accompanying drawings:

ADC Analog-to-Digital Converter;
AFE Analog Front End;
AN Access Node;
C-DPU Central Distribution Point Unit;
CRC Cyclic Redundancy Check;
CPE Customer Premises Equipment;
DAC Digital-to-Analog Converter;
DFE Digital Front End;
DMT Discrete Multi-Tone;
DPU Distribution Point Unit;
DSP Digital Signal Processor;
DSL Digital Subscriber Line;
DTU Data Transfer Unit;
FD Frequency Domain;
FEQ Frequency Domain Equalizer;
FEXT Far-End Crosstalk;
I/O Input/Output;
LAN Local Area Network;
MRC Maximum Ratio Combining;
MRO Multiline Rate Objective;
OFDM Orthogonal Frequency-Division Multiplexing;
OLT Optical Line Terminal;
ONU Optical Network Unit;
PON Passive Optical Network;
POTS Plain Old Telephone Service;
PSD Power Spectral Density;
RF Radio Frequency;
SNR Signal to Noise Ratio;
TD Time Domain; and
TDMA Time-Division Multiple Access.

As used herein, the term "vectoring" refers to advanced digital-signal-processing technology aimed, inter alia, at cancelling or mitigating far-end crosstalk (FEXT) interference to improve performance and provide more consistent data-transmission speeds. Vectoring can be implemented, e.g., by estimating the crosstalk coupling corresponding to a multi-line cable or binder and then using the estimate for the real-time adjustment of transmitted and/or received signals in a manner that significantly reduces the detrimental effects of crosstalk at the remote or local receiver(s).

Beamforming was initially developed in wireless communications for transmitting signals from an array of antennas to one or multiple receivers. Beamforming can be used, e.g., to increase the signal power at the intended receiver while reducing interference to non-intended receivers. A high signal power at the intended receiver can be achieved, e.g., by transmitting the same data signal from many antennas, but with different amplitudes and phases, such that the transmitted signal variants add constructively at the intended receiver. Low interference can be accomplished, e.g., by causing the transmitted signal variants to add destructively or randomly at non-intended receivers.

Beamforming may also be used in wireline systems, with the downlink multicast transmissions in multicarrier or single-carrier DSL systems being one example of such use. In this context, transmit beamforming can be implemented, e.g., by adjusting the amplitudes and phases of the signals transmitted over different wirelines to form, by way of crosstalk coupling, a strong signal at the intended receiver. Receive beamforming can also be implemented in wireline systems, e.g., as further explained below in reference to FIGS. 11-13. At least some forms of beamforming may run on vectoring engines and/or benefit from the use of at least some features developed for vectoring.

FIG. 1 shows a block diagram of a communication system 100 in which some embodiments can be practiced. System 100 comprises a distribution point unit (DPU) 110 and a plurality of customer-premises-equipment (CPE) units $150_1$-$150_N$ connected by way of subscriber lines $140_1$-$140_N$ as indicated in FIG. 1. In some embodiments, DPU 110 may be located at a "central office" of the service provider (e.g., a telephone company). In some other embodiments, DPU 110 may be remotely deployed using one or more backhaul (e.g., optical) links to a location that is closer to the subscriber premises than that of the central office, and the corresponding equipment can be physically placed in a street cabinet, on a pole, in the basement of a building, etc. CPE units $150_1$-$150_N$ are typically located at different respective customer sites. In some embodiments, DPU 110 can be implemented and referred to as an access node (AN) 110.

Each of subscriber lines $140_1$-$140_N$ typically comprises a respective "twisted-pair" (or other suitable) cable configured to transmit signals corresponding to voice and/or data services. At DPU 110, each of subscriber lines $140_1$-$140_N$ is connected to a respective one of input/output (I/O) ports $138_1$-$138_N$. At the CPE side, each of subscriber lines $140_1$-$140_N$ is similarly connected to a respective one of I/O ports $142_1$-$142_N$, each being an I/O port of a respective one of CPE units $150_1$-$150_N$.

In an example embodiment, DPU (or AN) 110 comprises a plurality of transceivers ($120_i/130_i$), each internally connected to a respective one of I/O ports $138_1$-$138_N$, where i=1, 2, ..., N. A transceiver ($120_i/130_i$) includes a respective transmitter $120_i$ and a respective receiver $130_i$. A CPE unit $150_i$ comprises a transceiver ($160_i/170_i$) internally connected to I/O port $142_1$ of that CPE unit. A transceiver ($160_i/170_i$) includes a respective transmitter $160_i$ and a respective receiver $170_i$. Example embodiments of transmitters 120, 160 are described in more detail below in reference to FIGS.

4-5. Example embodiments of receivers 130, 170 are described in more detail below in reference to FIGS. 3 and 11.

In some embodiments, system 100 can be configured to use beamforming and/or vectoring, e.g., as described below in reference to FIGS. 5-13.

Figure 2:
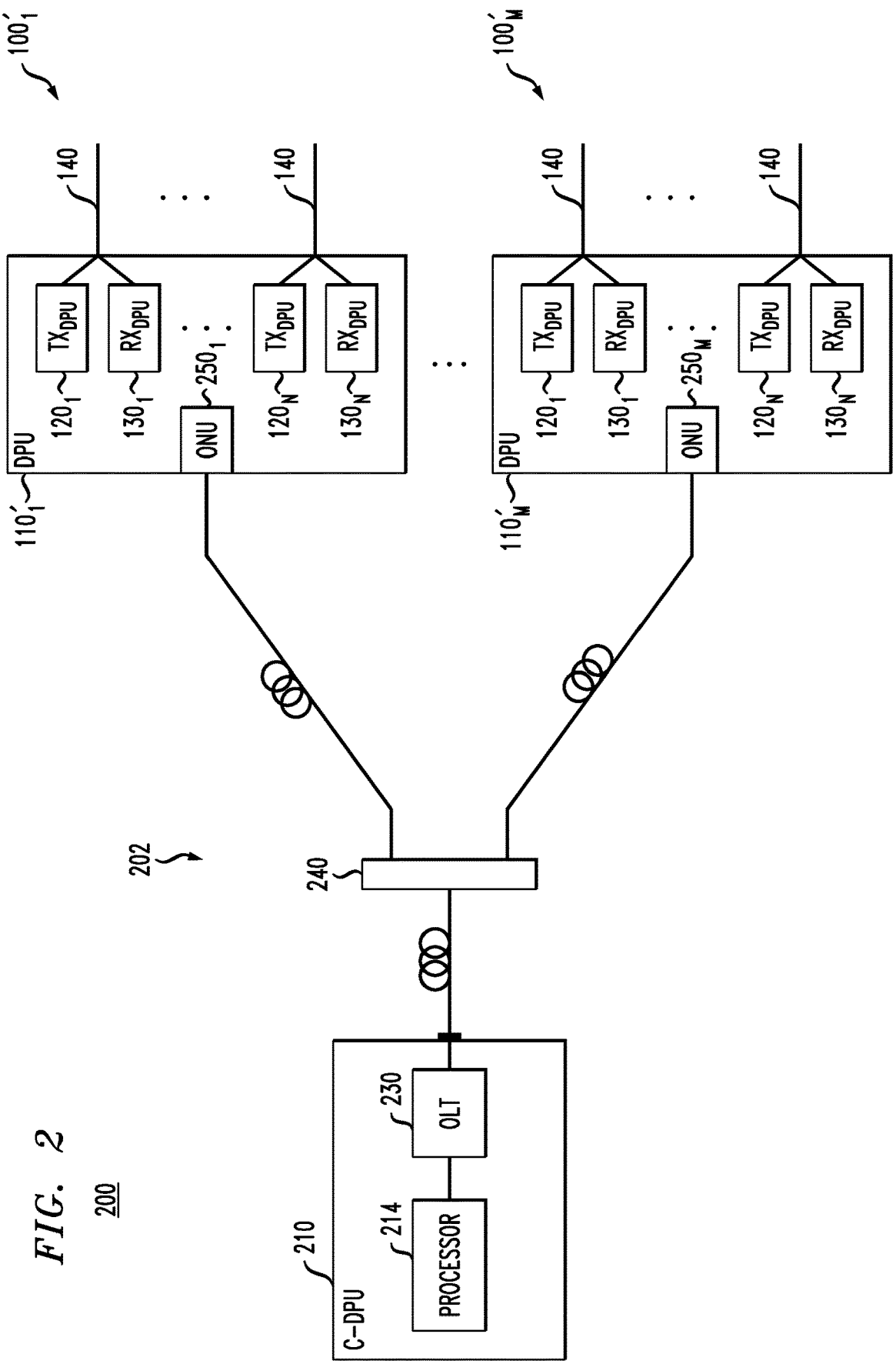
FIG. 2 shows a block diagram of another example communication system in which some embodiments can also be practiced.

FIG. 2 shows a block diagram of a communication system 200 in which some embodiments can also be practiced. System 200 includes M systems 100' (labeled $100_1'$-$100_M'$) connected to a shared central DPU (C-DPU) 210 using a passive optical network (PON) 202, where M is an integer greater than one.

In the shown embodiment, PON 202 has a point-to-multipoint architecture in which a passive optical router 240 is used to enable an optical line terminal (OLT) 230 located at C-DPU 210 to broadcast data transmissions to optical network units (ONUs) $250_1$-$250_M$ located at DPUs $110_1'$-$110_M'$, respectively. Downlink signals can be broadcast to all ONUs $250_1$-$250_M$ or at least a group of ONUs 250. Uplink signals from ONUs $250_1$-$250_M$ can be sent to OLT 230 using a multiple access protocol, e.g., time division multiple access (TDMA).

In alternative embodiments, other suitable optical and non-optical links can be used to connect C-DPU 210 and the systems 100'. Some non-limiting examples include the optical Ethernet and mmWave link.

Each of DPUs $110_1'$-$110_M'$ is connected, by way of a respective set of subscriber lines 140, to a respective set of CPEs 150 (not explicitly shown in FIG. 2; see FIG. 1). In addition to having a respective one of ONUs $250_1$-$250_M$, a DPU 110' may differ from DPU 100 (FIG. 1) in that the DPU 110' may have a lower processing power than DPU 100. On the other hand, C-DPU 210 includes a relatively powerful processor 214 capable of providing additional processing power to some or all of DPUs $110_1'$-$110_M'$. For example, a DPU 110' may be configured to: (i) perform locally the low-complexity beamforming processing for one or more of the tones according to one of the embodiments disclosed herein; and (ii) offload the vectoring processing for other tones to processor 214. The data processing performed by processor 214 and the bidirectional data transfer via PON 202 can be appropriately organized such that DPUs $110_1'$-$110_M'$ can have proper and sufficient shared access to the processing power of processor 214.

Figure 3:
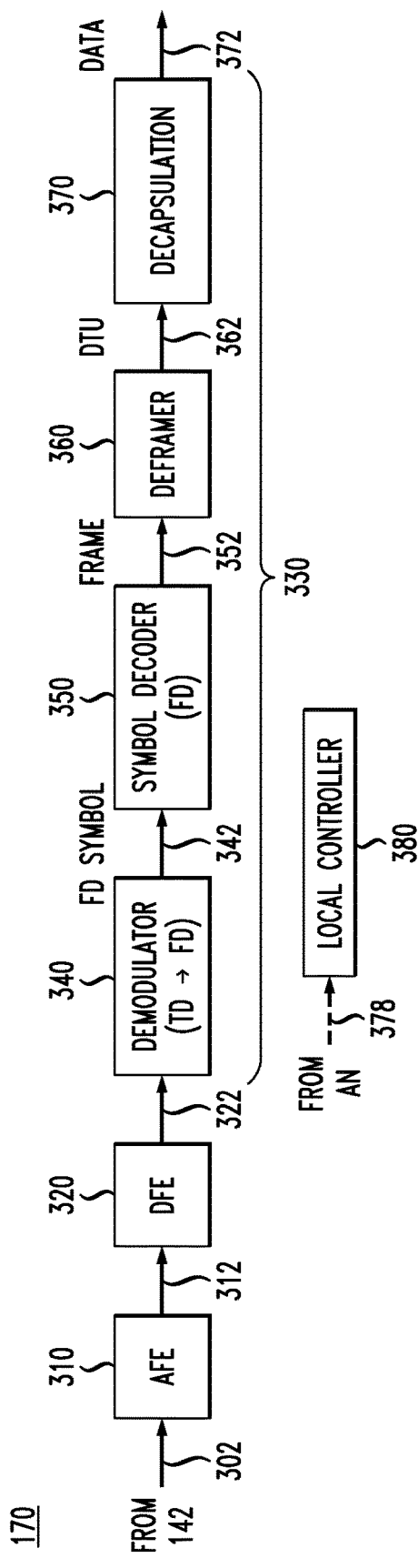
FIG. 3 shows a block diagram of a customer-premises-equipment (CPE) receiver that can be used in the communication systems of FIGS. 1, 2 according to an embodiment.

FIG. 3 shows a block diagram of a receiver 170 that can be used in systems 100 (FIG. 1) and/or 200 (FIG. 2) according to an embodiment. Receiver 170 comprises an analog front end (AFE) 310, a digital front end (DFE) 320, and a digital signal processor (DSP) 330. Receiver 170 further comprises a local electronic controller 380 that may be used to control certain functions and/or transmission schedules of one or both of receiver 170 and transmitter 160 of the same host CPE unit 150.

AFE 310 operates to convert a modulated electrical input signal 302 received through a corresponding I/O port 142 into a corresponding analog electrical radio-frequency (RF) signal 312 suitable for digitization in DFE 320. The typical analog signal processing applied to input signal 302 in AFE 310 includes amplification and filtering.

AFE 310 can be a conventional receiver-AFE circuit. Example receiver-AFE circuits that may be suitable for implementing some embodiments of AFE 310 are briefly reviewed, e.g., by N. Stojkovic in "ADSL Analog Front End," AUTOMATIKA v. 47 (2006), no. 1-2, pp. 59-67, which is incorporated herein by reference in its entirety.

DFE 320 operates to sample signal 312 at an appropriate sampling rate to generate a corresponding sequence 322 of digital samples (values). In an example embodiment, DFE 320 comprises an analog-to-digital converter (ADC) and other pertinent circuitry known to those skilled in the pertinent art.

In an example embodiment, DSP 330 comprises a demodulator 340, a symbol decoder 350, a deframer 360, and a decapsulation module 370. Demodulator 340 uses a Fourier transform, as known in the pertinent art, to perform time-domain (TD) to frequency-domain (FD) signal conversion, thereby converting sequence 322 into the corresponding sequence 342 of FD symbols. Symbol decoder 350 then applies constellation and carrier demapping to convert sequence 342 into the corresponding data frame(s) 352. Deframer 360 operates to extract the corresponding data transfer unit (DTU) 362 from data frame 352, e.g., by removing the frame header(s) and performing other pertinent operations as known in the art. A typical DTU includes a DTU header, a payload portion, and a cyclic-redundancy-check (CRC) portion. Decapsulation module 370 then extracts payload data 372 from DTUs 362 and directs the extracted data to external circuits.

In an example embodiment, controller 380 may control configuration settings and/or the scheduling associated with various receiver functions in response to a control signal 378 received via appropriate control channels, e.g., from DPU 110. For example, symbol decoder 350 may include a selector, which, under control of controller 380, determines which resource blocks (if any) can carry data for the subscriber associated with this CPE unit 150. These resource blocks may then be selected for decoding in symbol decoder 350, whereas the remaining resource blocks may be ignored or discarded.

Figure 4:
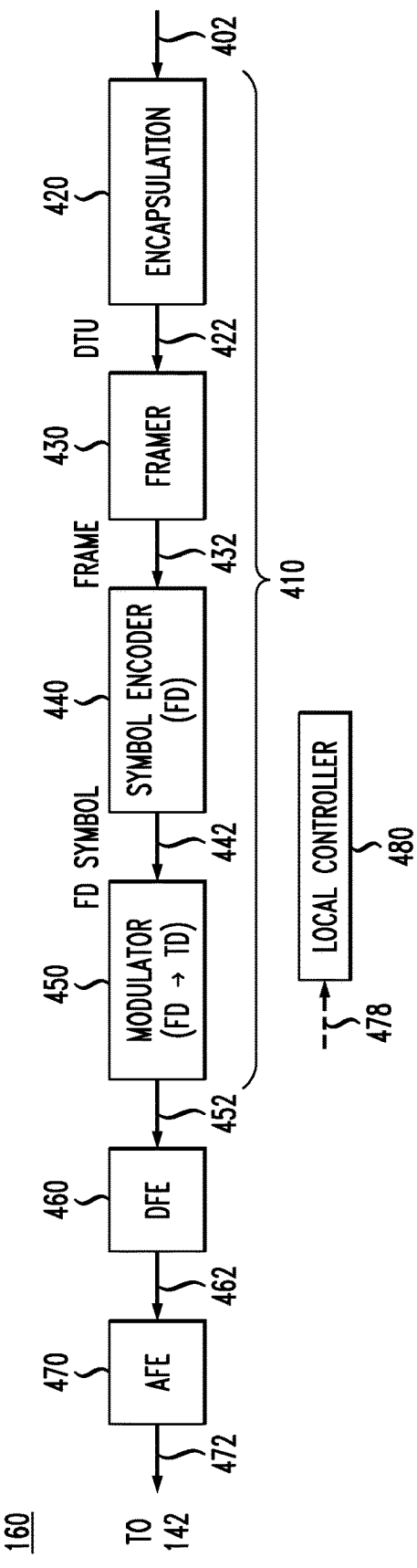
FIG. 4 shows a block diagram of a CPE transmitter that can be used in the communication systems of FIGS. 1, 2 according to an embodiment.

FIG. 4 shows a block diagram of a transmitter 160 that can be used in system 100 (FIG. 1) and/or system 200 (FIG. 2) according to an embodiment. Transmitter 160 comprises a DSP 410, a DFE 460, and an AFE 470. Transmitter 160 further comprises a local electronic controller 480 that may be used to control certain functions of the transmitter.

DSP 410 operates to carry out data encoding and FD-to-TD signal conversion to generate a digital output signal 452 having encoded thereon an input data stream 402. DFE 460 operates to convert digital signal 452 into an analog form (e.g., using a digital-to-analog converter, DAC) to generate a corresponding analog electrical signal 462. AFE 470 then converts signal 462 into a form suitable for transmission over a subscriber line 140 and applies a resulting modulated electrical signal 472 to a corresponding I/O port 142.

Example transmitter-AFE circuits suitable for implementing at least some embodiments of AFE 470 are briefly reviewed, e.g., in the above-cited paper by N. Stojkovic. In some embodiments, AFE 310 and AFE 470 belonging to the same CPE unit 150 can share some circuit elements, such as a clocking system and an electrical hybrid.

In an example embodiment, DSP 410 comprises an encapsulation module 420, a framer 430, a symbol encoder 440, and a modulator 450. Encapsulation module 420 operates to encapsulate input data 402, as payload data, into DTUs 422. As already indicated above, in addition to the payload data portion, a DTU may include a DTU header and a CRC portion. Framer 430 then uses DTUs 422 to generate data frames 432, e.g., by adding frame headers and performing other appropriate operations. Symbol encoder 440 performs constellation and carrier mapping to generate FD symbols 442, each comprising a set of constellation symbols intended for transmission using a different respective tone (having a different respective carrier frequency). Depending on the specific embodiment, the number of tones used in symbol encoder 440 can be on the order of one hundred, one thousand, or even greater than one thousand. Modulator 450 uses an inverse Fourier transform, as known in the pertinent art, for FD-to-TD signal conversion, thereby converting FD symbols 442 into digital signal 452 representing the corresponding TD waveforms.

Figure 11:
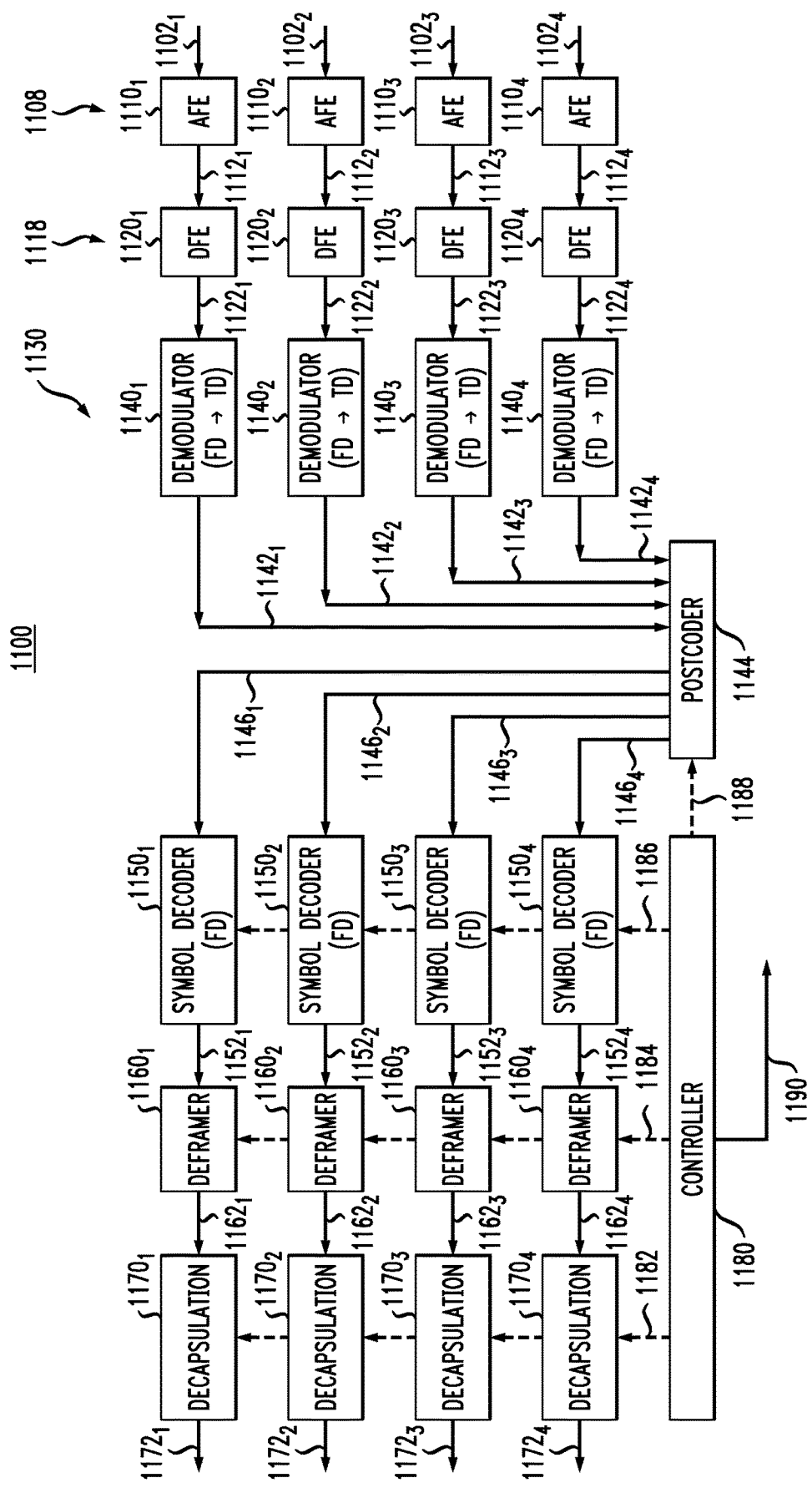
FIG. 11 shows a block diagram of a multi-line receiver that can be used in the communication systems of FIGS. 1, 2 according to an embodiment.

In an example embodiment, controller 480 may control configuration settings and/or the scheduling associated with various transmitter functions in response to a control signal 478 received via appropriate control channels, e.g., from DPU 110. For example, control signal 478 may be generated based on control signal 1190 (FIG. 11). As already indicated above, in some embodiments, controllers 380 (FIG. 3) and 480 of the same host CPE unit 150 may be integrated into a single controller.

Figure 5:
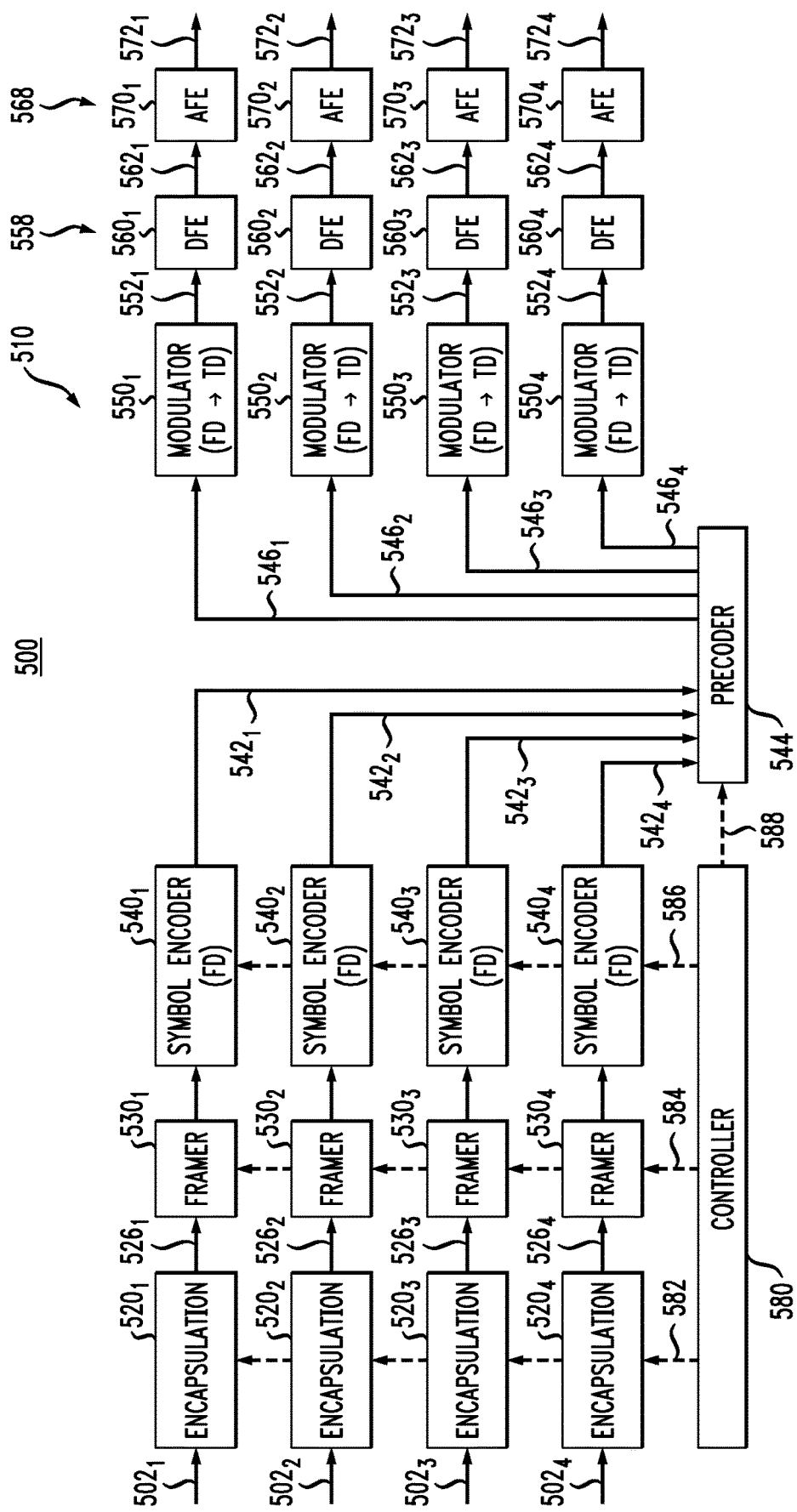
FIG. 5 shows a block diagram of a multi-line transmitter that can be used in the communication systems of FIGS. 1, 2 according to an embodiment.

FIG. 5 shows a block diagram of a multi-line transmitter 500 that can be used in a DPU 110 (FIGS. 1, 2) according to an embodiment. For example, transmitter 500 can be used to implement transmitters $120_1$-$120_N$ (FIG. 1). For illustration purposes and without any implied limitations, transmitter 500 is shown and described in reference to an example embodiment corresponding to N=4. From the provided description, a person of ordinary skill in the art will be able to make and use, without any undue experimentation, other embodiments corresponding to other values of N.

As shown in FIG. 5, transmitter 500 comprises a DSP 510, a DFE 558, and an AFE 568. In an example embodiment, transmitter 500 can be configured to operate using some of the methods described below in reference to FIGS. 7-9.

In an example embodiment, DSP 510 comprises encapsulation modules $520_1$-$520_N$, framers $530_1$-$530_N$, symbol encoders $540_1$-$540_N$, a precoder 544, and modulators $550_1$-$550_N$.

Encapsulation modules $520_1$-$520_N$ operate to encapsulate input data $502_1$-$502_N$, as payload data, into DTUs $526_1$-$526_N$. Framers $530_1$-$530_N$ and symbol encoders $540_1$-$540_N$ then operate to frame and encode the received DTUs $526_1$-$526_N$, thereby producing N different encoded data signals $542_1$-$542_N$. Precoder 544 operates to convert data signals $542_1$-$542_N$ into data signals $546_1$-$546_N$. In an example embodiment, different precoding schemes may be applied by precoder 544 to different groups of tones, e.g., as described in more detail below in reference to FIG. 6. A controller 580 is configured to appropriately control, by way of control signals 582, 584, 586, and 588, the operations of encapsulation modules $520_1$-$520_N$, framers $530_1$-$530_N$, symbol encoders $540_1$-$540_N$, and precoder 544, respectively, such that appropriate relative amounts of input data $502_1$-$502_N$ are taken from each tributary to generate constellation symbols, etc., for each resource block.

Each modulator $550_i$ (where i=1, ..., N) uses an inverse Fourier transform, as known in the pertinent art, for FD-to-TD signal conversion, thereby converting data signal $546_i$ into a digital signal $552_i$ representing the corresponding TD waveform. Digital signals $552_1$-$552_N$ generated in this manner are then applied to DFE 558.

DFE 558 comprises line DFEs $560_1$-$560_N$. Line DFE $560_i$ operates to convert digital signal $552_i$ into an analog form (e.g., using a digital-to-analog converter, DAC) to generate a corresponding analog electrical signal $562_i$. Analog electrical signal $562_1$-$562_N$ generated in this manner are then applied to AFE 568.

AFE 568 comprises line AFEs $570_1$-$570_N$. Line AFE $570_1$ operates to convert analog electrical signal $562_i$ into a form suitable for transmission over subscriber line $140_i$ and applies a resulting modulated electrical signal $572_i$ to a corresponding I/O port $138_i$.

Figure 6:
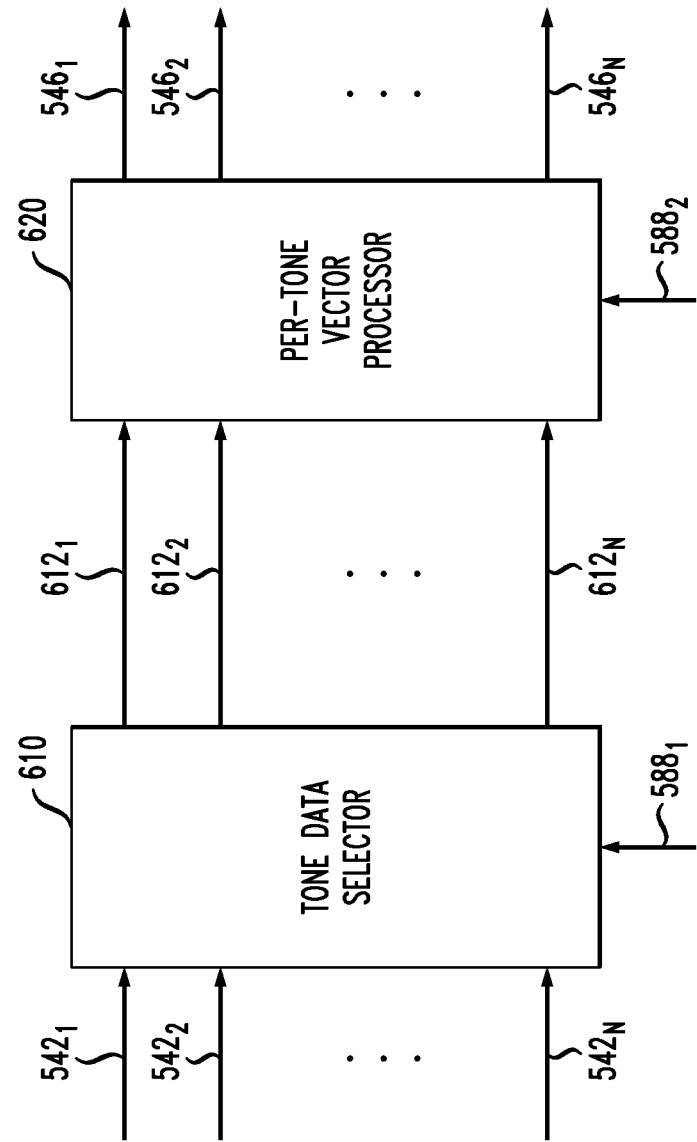
FIG. 6 shows a block diagram of a precoder that can be used in the multi-line transmitter of FIG. 5 according to an embodiment.

FIG. 6 shows a block diagram of precoder 544 according to an embodiment. Data signals $542_1$-$542_N$ and $546_1$-$546_N$ and control signal(s) 588 are also shown in FIG. 6 to better illustrate the relationship between the circuits of FIGS. 5 and 6.

As shown in FIG. 6, precoder 544 comprises a data selector 610 and a vector processor 620.

Control signal $588_1$ controls the configuration of data selector 610, which determines the manner in which the digital values supplied by data signals $542_1$-$542_N$ are passed, by way of a data bus $612_1$-$612_N$, to vector processor 620. In an example embodiment, a set of K tones allocated for carrying data signals $542_1$-$542_N$ may include two distinct subsets. If the tone belongs to the first subset, then control signal $588_1$ causes data selector 610 to select and pass to vector processor 620 one value from each of data signals $542_1$-$542_N$. Thus, in this configuration, vector processor 620 receives a vector of N scalar values from data selector 610 for processing. If the tone belongs to the second subset, then control signal $588_1$ causes data selector 610 to select and pass to vector processor 620 one (i.e., single) scalar value from all of data signals $542_1$-$542_N$. Control signal $588_1$ also determines from which of data signals $542_1$-$542_N$ said single scalar value is selected and passed. Thus, in the second configuration, vector processor 620 receives one scalar value from data selector 610 for processing. Each of the various scalar values referred-to herein can generally be complex-valued.

In different embodiments, the K tones can be sorted into the first and second subsets using any suitable criteria. For example, in one embodiment, the tones whose carrier frequency is smaller than a fixed threshold frequency may be placed into the first subset, while the tones whose carrier frequency is greater than the threshold frequency are placed into the second subset. In another embodiment, the tones whose effective SNR value is greater than a fixed threshold SNR value may be placed into the first subset, while the tones whose effective SNR value is smaller than the threshold SNR value are placed into the second subset. In other embodiments, other suitable tone-sorting schemes may alternatively be used.

For example, in one possible embodiment, the first subset may include tones of the 0-106 MHz band, and the second subset may include tones of the 106-212 MHz band.

In some embodiments, the first subset can be empty, i.e., all tones are sorted into the second subset.

In different embodiments, control signal $588_1$ may be generated to control the second configuration of data selector 610 such that the selection of the data signal $542_n$ from which the single value is passed onto vector processor 620 can be changed based on any suitable schedule. For example, in one embodiment, a round-robin schedule can be used. In another embodiment, the schedule can be based on one or more of the following: (i) the relative quality of service (QoS) requirements corresponding to the different subscribers; and (ii) the subscribers' relative rankings, traffic priorities, and/or traffic volumes.

Control signal $588_2$ controls the configuration of vector processor 620 such that the vector processor can operate compatibly with data selector 610.

For example, when vector processor 620 receives a vector input from data selector 610 in the first configuration of the latter, the vector processor operates to convert the received vector input into a corresponding vector output for data signals $546_1$-$546_N$. In an example embodiment, this vector-to-vector conversion is performed in accordance with Eq. (1):

$$B^{(k)} = P^{(k)} A^{(k)} \quad (1)$$

where $B^{(k)}$ is the output vector of values generated by vector processor 620 for data signals $546_1$-$546_N$; $P^{(k)}$ is the precoder matrix; $A^{(k)}$ is the input vector of values received by vector processor 620 from data selector 610; and k is the tone index, e.g., $k \in \{1, \ldots, K\}$. Each of the vectors $A^{(k)}$ and $B^{(k)}$ has N components, which can generally be complex-valued. The precoder matrix $P^{(k)}$ is an N×N matrix. In an example embodiment, the matrix elements of the precoder matrix $P^{(k)}$ are complex values selected such that the FEXT interference for the k-th tone is significantly reduced or canceled. Example methods that can be used to determine the matrix elements of the precoder matrix $P^{(k)}$ are described, e.g., in the above-cited U.S. patent application Ser. No. 16/246,989.

When vector processor 620 receives a scalar input from data selector 610 in the second configuration of the latter, the vector processor operates to convert the received scalar input into a corresponding vector output for data signals $546_1$-$546_N$. In an example embodiment, this scalar-to-vector conversion is performed in accordance with Eq. (2):

$$B^{(k)} = V_n^{(k)} a_n^{(k)} \quad (2)$$

where $V_n^{(k)}$ is the precoder vector for the scalar input received by vector processor 620 via the bus line $612_n$; $a_n^{(k)}$ is the value of the scalar input received by vector processor 620 via the bus line $612_n$; and n is the line index, e.g., $n \in \{1, \ldots, N\}$. The scalar input $a_n^{(k)}$ is generally complex-valued. The precoder vector $V_n^{(k)}$ has N components. In an example embodiment, the vector elements of the precoder vector $V_n^{(k)}$ are complex values selected such that beamforming is performed on the k-th tone for the remote data receiver connected to subscriber line $140_n$. Example methods that can be used to determine the vector elements of the precoder vector $V_n^{(k)}$ are described below in reference to FIGS. 8-9.

In an example embodiment, the number K of tones can range, e.g., between about 2000 and about 16000. However, a relatively large value of K can cause vector processor 620 to be a computationally very demanding building block. For example, for a system with N lines and K tones, vector processor 620 may need to be able to perform about N×N×K high-precision complex-value multiplications per DMT symbol. A person of ordinary skill in the art will readily recognize that a typical complex-value multiplication corresponds to four real-value multiplications. Provided that vector processor 620 may have to process up to about 48000 DMT symbols per second or more, the corresponding required processing power can be very high, which typically translates into the correspondingly high component cost and high power consumption. Therefore, practical solutions directed at reducing the required processing power may be very desirable.

Some of these and possibly other related problems in the state of the art can be addressed using at least some embodiments disclosed herein. For example, some embodiments can be used to implement low-complexity beamforming schemes that can reduce the amount of or avoid altogether the computationally expensive complex-value multiplication operations. More specifically, in some embodiments, the vector elements of the precoder vector $V_n^{(k)}$ can be restricted to the values from the set $\{1,-1\}$ or from the set $\{1,-1,j,-j\}$ that can be represented with one or two bits, respectively, and for which the processing of the scalar input to the vector output can be implemented with plain sign changes and/or swaps of the real and imaginary parts of the scalar input. Such embodiments may advantageously be capable of reducing the hardware complexity of the corresponding circuits by about two orders of magnitude compared to at least some implementations that require the above-indicated amounts of complex-value multiplication operations. At least some embodiments, e.g., with appropriate optimizations being implemented therein, may be able to closely approach the performance characteristics of the significantly more-complex schemes that rely on relatively large amounts of complex-value multiplication operations, e.g., as outlined above.

In at least some embodiments, the vector elements of the precoder vector $V_n^{(k)}$ can be restricted to the values from the set $\{0,1,-1\}$ or from the set $\{0,1,-1,j,-j\}$. The effect of the inclusion of 0 into the possible values is that the resulting beamforming can be implemented more effectively in some cases, e.g., by nulling some undesired components. A person of ordinary skill in the art will understand that the values from the set $\{0,1,-1\}$ or from the set $\{0, 1,-1,j,-j\}$ can be represented with two or three bits, respectively.

Figure 7:
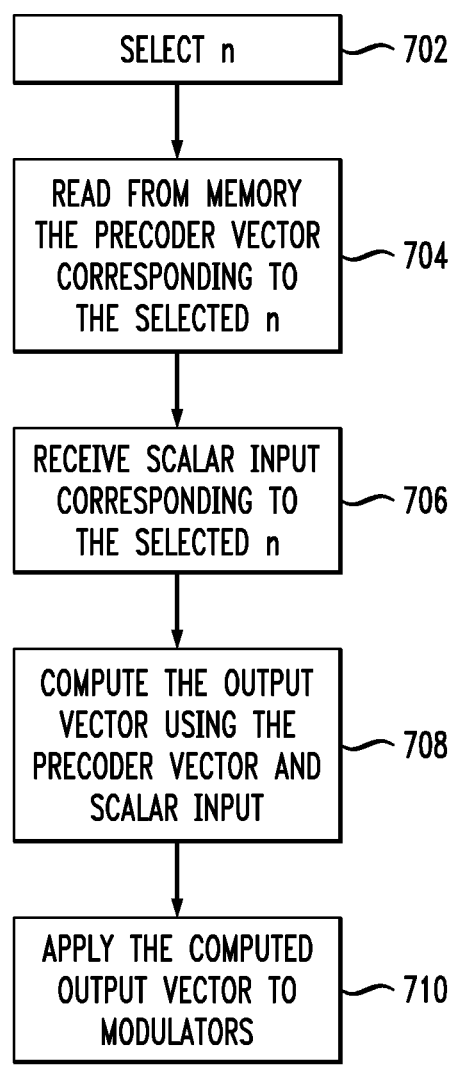
FIG. 7 shows a flowchart of a processing method that can be used in the precoder of FIG. 6 according to an embodiment.

FIG. 7 shows a flowchart of a processing method 700 that can be used in precoder 544 according to an embodiment. Method 700 can be used, e.g., in the above-described second configuration, i.e., when vector processor 620 receives a scalar input from data selector 610. For illustration purposes and without any implied limitations, method 700 is described for a single selected value of the tone index k corresponding to the second subset of tones. A person of ordinary skill in the art will understand, without any undue experimentation, how to apply method 700 to more than one tone from the second subset of tones.

At step 702 of method 700, a value of the line index n is selected. Appropriate control signals $588_1$ and $588_2$ are then generated to communicate the selected line-index value to precoder 544 (also see FIGS. 5-6). As already indicated above, the selected line-index value identifies the remote data receiver for which the beamforming precoding is going to be performed on the k-th tone. In different instances of step 702, different respective line-index values may be selected.

At step 704, vector processor 620 retrieves from the memory the precoder vector $V_n^{(k)}$. In an example embodiment, each of the vector components of the precoder vector $V_n^{(k)}$ has a value that belongs to the set $\{1, -1\}$ or to the set $\{1,-1,j,-j\}$.

At step 706, vector processor 620 receives the scalar input value $a_n^{(k)}$ on the bus line $612_n$.

At step 708, vector processor 620 computes the output vector $B^{(k)}$ in accordance with Eq. (2). Eqs. (3a)-(3c) give more-detailed mathematical expressions for a vector component $b_i$ of the output vector $B^{(k)}$:

$$b_i = x_{Re} + jx_{Im} \quad (3a)$$

$$a_n^k = u_{Re} + ju_{Im} \quad (3b)$$

$$x_{Re} + jx_{Im} = v_i(u_{Re} + ju_{Im}) \quad (3c)$$

where $x_{Re}$ and $x_{Im}$ are the real and imaginary parts, respectively, of the vector component $b_i$; $u_{Re}$ and $u_{Im}$ are the real and imaginary parts, respectively, of the scalar input value $a_n^{(k)}$; and $v_{i,n}$ is the i-th component of the precoder vector $V_n^{(k)}$.

If $v_i=1$, then Eq. (3c) can be rewritten as follows:

$$x_{Re} = u_{Re} \quad (4a)$$

$$x_{Im} = u_{Im} \quad (4b)$$

In this case, the computation of $b_i$ involves copying the input to the output.

If $v_i=-1$, then Eq. (3c) can be rewritten as follows:

$$x_{Re} = -u_{Re} \quad (5a)$$

$$x_{Im} = -u_{Im} \quad (5b)$$

In this case, the computation of $b_i$ involves two sign changes of the corresponding real values.

If $v_i=j$, then Eq. (3c) can be rewritten as follows:

$$x_{Re} = -u_{Im} \quad (6a)$$

$$x_{Im} = u_{Re} \quad (6b)$$

In this case, the computation of $b_i$ involves a swap of the real and imaginary parts and one sign change.

If $v_i=j$, then Eq. (3c) can be rewritten as follows:

$$x_{Re} = u_{Im} \quad (7a)$$

$$x_{Im} = -u_{Re} \quad (7B)$$

In this case, the computation of $b_i$ also involves a swap of the real and imaginary parts and one sign change.

As is clearly evident from Eqs. (4)-(7), the computations of the output vector $B^{(k)}$ in this particular setting do not require high-precision multiplications and, as such, can be implemented using relatively simple digital logic circuits. A person of ordinary skill in the art will readily understand, without any undue experimentation, how to make and use such circuits to implement a suitable embodiment of vector processor 620.

At step 710, vector processor 620 outputs the output vector $B^{(k)}$ computed at step 708, thereby generating the corresponding portion of data signals 546$_1$-546$_N$ for use in modulators 550$_1$-550$_N$.

Figure 8:
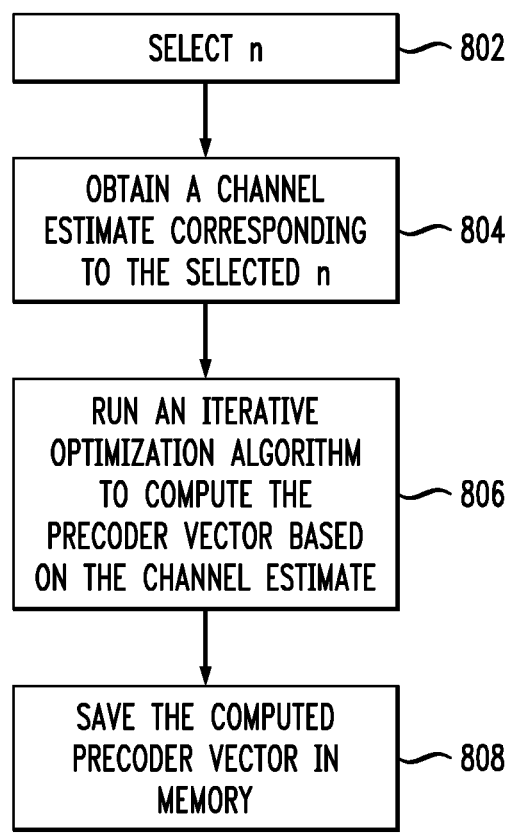
FIG. 8 shows a flowchart of a communication method that can be used to configure the precoder of FIG. 6 according to an embodiment.

FIG. 8 shows a flowchart of a communication method 800 that can be used to configure precoder 544 according to an embodiment. More specifically, method 800 is directed at determining the precoder vector $V_n^{(k)}$ that can then be used at steps 704 and 708 of method 700. For illustration purposes and without any implied limitations, method 800 is described for a single selected value of the tone index k corresponding to the second subset of tones. A person of ordinary skill in the art will understand, without any undue experimentation, how to apply method 800 to more than one tone from the second subset of tones.

At step 802 of method 800, a value of the line index n is selected. As already indicated above, the selected line-index value identifies the remote data receiver for which the beamforming precoding is going to be performed. In different instances of step 802, different respective line-index values may be selected.

At step 804, a sequence of pilot (e.g., calibration) signals is applied to lines 140$_1$-140$_N$ and the corresponding signals received by data receiver 170$_n$ are measured and communicated back to DPU 110. The measurement results are then processed to obtain an estimate of the channel for transmissions from DPU 110 to data receiver 170$_n$. In an example embodiment, the channel estimate may have a form of a complex-valued vector $H_n^{(k)}$ having N components. The computed vector $H_n^{(k)}$ is saved in the memory, e.g., for the subsequent use at step 806.

At step 806, an iterative algorithm is run to compute the precoder vector $V_n^{(k)}$ based on the channel vector $H_n^{(k)}$ determined at step 806. Unlike the channel vector $H_n^{(k)}$, the precoder vector $V_n^{(k)}$ can only have components selected from the set {1,−1}, or from the set {1,−1,j,−j}, or from the set {1, 0, −1}, or from the set {1,0,−1,j,−j}. The iterative algorithm is generally designed and configured to select the different components of the precoder vector $v_n^{(k)}$ such that the use of the resulting precoder vector $V_n^{(k)}$ at step 708 of method 700 results in nearly optimal constructive interference of the transmitted signals at data receiver 170$_n$.

An example embodiment of step 806 is described in more detail below in reference to FIG. 9. A person of ordinary skill in the art will be able to modify the example iterative algorithm for the specific intended system configuration. For example, some of the optimization criteria and/or constrains may be modified as appropriate or necessary.

At step 808, the precoder vector $V_n^{(k)}$ computed at step 806 is saved in the memory for the subsequent use, e.g., at step 708 of method 700.

Figure 9:
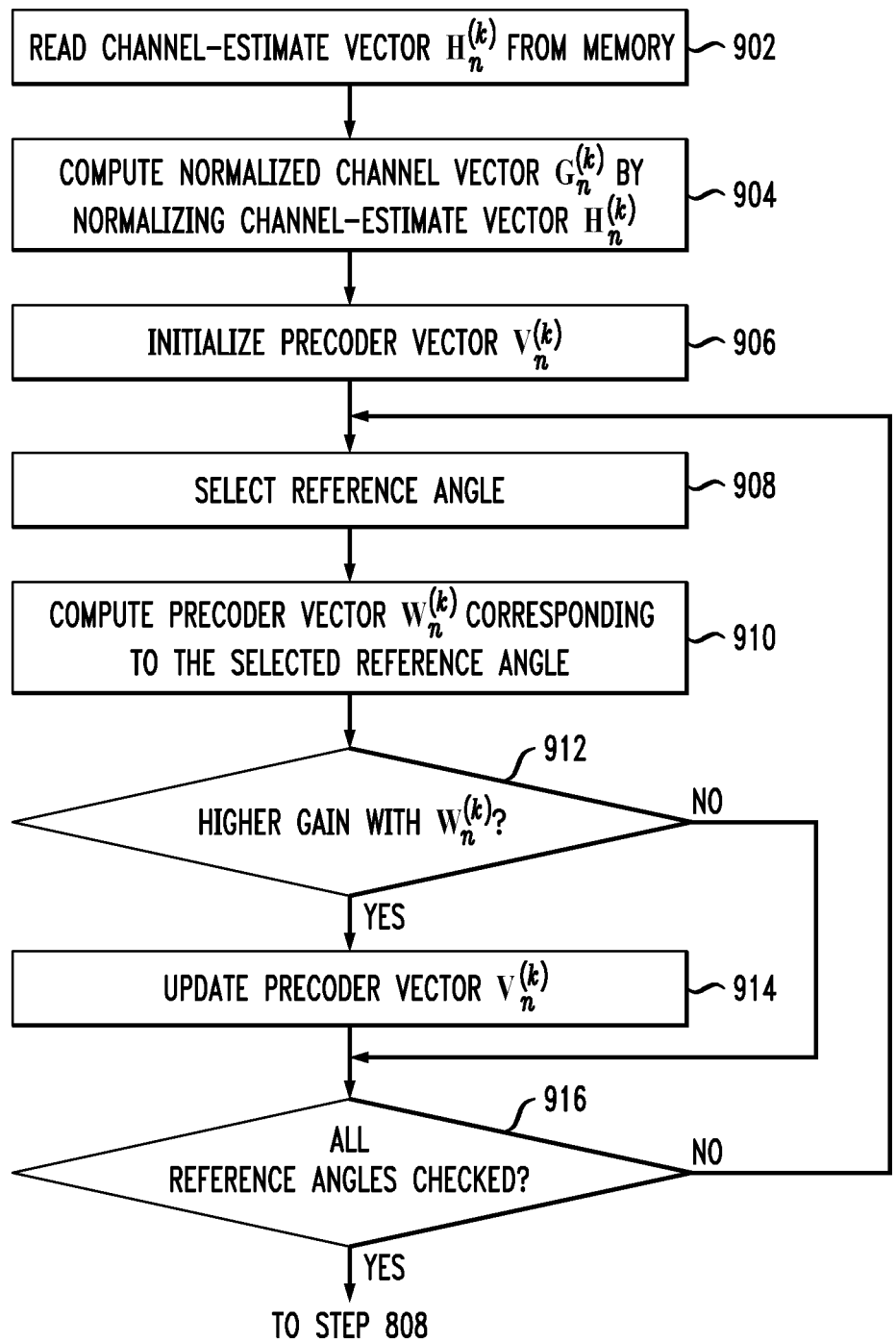
FIG. 9 shows a flowchart of an iterative algorithm that can be used in the communication method of FIG. 8 according to an embodiment.

FIG. 9 shows a flowchart of an iterative algorithm that can be used to implement step 806 of method 800 according to an embodiment.

In an example embodiment, the iterative algorithm can be configured to heuristically solve the following optimization problem:

$$\forall k, n: \max_{\{\forall i: p_{i,n}^{(k)} \in \{1,-1,j,-j\}\}} \log_2\left\{1 + \frac{1}{\Gamma} \frac{|\sum_i H_{n,i}^{(k)} p_{i,n}^{(k)}|^2 \sigma_{n,n}^{(k)}}{\sigma_n^{(k)}}\right\} \quad (8)$$

where $p_{i,n}^{(k)}$ is the i-th component of the precoder vector $V_n^{(k)}$; $H_{n,i}^{(k)}$ is the i-th component of the channel-estimate vector $H_n^{(k)}$, $\Gamma$ is the applicable gap to Shannon capacity; $\sigma_{n,n}^{(k)}$ is the transmit signal power corresponding to the n-th transmitter; and $\sigma_n^{(k)}$ is the receiver noise power corresponding to the n-th receiver.

Alternatively, the optimization problem of Eq. (8) can be presented as follows:

$$\forall k, n: \max_{\{\forall i: p_{i,n}^{(k)} \in \{1,-1,j,-j\}\}} |\sum_i H_{n,i}^{(k)} p_{i,n}^{(k)}|^2 \quad (9)$$

In some embodiments, the allowed values of $p_{i,n}^{(k)}$ used in the max functions of Eqs. (8)-(9) can be changed to $p_{i,n}^{(k)} \in \{1,-1\}$.

An example embodiment of the iterative algorithm that can be used to find an approximate solution of either of these optimization problems is described below.

Note that, with sign changes and phase rotations (such as the swaps of the real and imaginary parts) only, e.g., as described above in reference to Eqs. (4)-(7), the power spectral density (PSD) on the k-th tone is substantially the same for all lines. In some cases, each line may have its own PSD constraint. For example, if much of the aggregate transmit power on a line is already consumed at lower frequencies, then the PSD budget on the k-th tone might be below the PSD mask. In such cases, the above-indicated optimization problems may still be used, but with at least some weighting factors $p_{i,n}^{(k)}$ being adaptively scaled back by a power of two until the PSD constraint is met. An example of such scaling, using scaling coefficients $s_{i,n}^{(k)} \in \{1, 2^{-1} 2^{-2}, \ldots, 2^{-M}, 0\}$, is described below in reference to FIGS. 14-15. A person of ordinary skill in the art will readily understand how to incorporate such scaling into method 800. A person of ordinary skill in the art will also appreciate that the scaling by a power of two can be achieved using a relatively simple logic circuit, e.g., performing bit shifts in a register.

At sub-step 902 of step 806, the channel-estimate vector $H_n^{(k)}$ computed at step 804 is read from the memory.

At sub-step 904, normalized channel vector $G_n^{(k)}$ is computed by dividing each component of the channel-estimate vector $H_n^{(k)}$ by $H_{n,n}^{(k)}$. Herein, the individual components of the normalized channel vector $G_n^{(k)}$ are denoted $G_{n,i}^{(k)}$, where $i=1, \ldots, N$.

At sub-step 906, the precoder vector $V_n^{(k)}$ is initialized to provide a starting point for the subsequent iterative changes. For example, one possible initialization may set each component $p_{i,n}^{(k)}$ to one, i.e., $p_{i,n}^{(k)}=1$ for each i. Alternative initialization schemes may also be used, provided that the initial choices of different components $p_{i,n}^{(k)}$ are restricted to the values from the set $\{1,-1\}$, or from the set $\{1, 0, -1\}$, or from the set $\{1,-1,j,-j\}$, or from the set $\{1,0,-1,j,-j\}$.

At sub-step 908, a reference angle $\alpha$ is selected.

In an example embodiment, the reference angle $\alpha$ can be selected from a set of discrete reference angles from the range between 0 and 90 degrees. The set of reference angles may contain angle values that sample this range with a selected granularity. For example, when the granularity is selected to be 18 degrees, the set will contain the angle values of 0, 18, 36, 54, 72, and 90 degrees. Finer or coarser granularities and/or non-uniform sampling may also be used. In some embodiments, a single reference angle $\alpha$ may be considered, e.g., the reference angle $\alpha$ corresponding to the direct line to the n-th remote data receiver.

At sub-step 910, a precoder vector $W_n^{(k)}$ corresponding to the reference angle $\alpha$ selected at sub-step 908 is computed. More specifically, different components $w_{i,n}^{(k)}$ of the precoder vector $W_n^{(k)}$ are selected from the set $\{1,-1,j,-j\}$ such as to approximately align the effective beamforming direction of the precoder vector $W_n^{(k)}$ with the reference angle $\alpha$. In mathematical terms, the corresponding per-component selection criterion can be expressed as follows:

$$\forall i: \underset{\{w_{i,n}^{(k)} \in \{1,-1,j,-j\}\}}{\operatorname{argmin}} |\alpha - \text{angle}(G_{n,i}^{(k)} w_{i,n}^{(k)})| \quad (10)$$

where angle(x) denotes an angle corresponding to the complex value x on the complex plane.

In some embodiments, the allowed values of $w_{i,n}^{(k)}$ used in the argmin function of Eq. (10) can be changed to $w_{i,n}^{(k)} \in \{1, -1\}$.

At sub-step 912, the beamforming gain of the precoder vector $W_n^{(k)}$ computed at sub-step 910 is compared with that of the precoder vector $V_n^{(k)}$. In an example embodiment, the comparison can be performed using dot products of the vectors $G_n^{(k)}$, $W_n^{(k)}$, and $V_n^{(k)}$, as indicated by the inequality given by Eq. (11):

$$|\Sigma_i G_{n,i}^{(k)} w_{i,n}^{(k)}| > |\Sigma_i G_{n,i}^{(k)} v_{i,n}^{(k)}| \quad (11)$$

If the inequality of Eq. (11) is satisfied, then the processing is directed to sub-step 914. Otherwise, the processing is directed to sub-step 916.

At sub-step 914, the previous version of the precoder vector $V_n^{(k)}$ is replaced by a better-performing version in accordance with Eq. (12):

$$V_n^{(k)} = W_n^{(k)} \quad (12)$$

A person of ordinary skill in the art will readily recognize that sub-step 914 provides iterative updates of the precoder vector $V_n^{(k)}$ directed at improving the beamforming performance of precoder 544.

Sub-step 916 controls the exit from the processing loop 908-916. More specifically, if all reference angles $\alpha$ have been checked, then the optimization processing exits the loop, and step 806 is terminated. Otherwise, the optimization processing continues by being redirected back to sub-step 908.

In some embodiments, it may be possible to use a same (fixed) precoder vector, $V_0^{(k)}$, for any line index n or for a subset line indices. A possible benefit of this approach is that vector processor 620 does not need to switch between different precoder vectors $V_n^{(k)}$ when n changes. This approach can also provide a number of advantages, e.g., in terms of relative ease with which different relevant estimates (e.g., channel/precoding tracking, FEQ tracking, bit loading/SNR estimation, etc.) can be generated and in terms of improved dynamic operation (e.g., faster update speeds, easier switching between users, etc.).

Deriving a fixed precoder vector $V_0^{(k)}$ for this particular setting may require a reformulation of the optimization problem (see Eqs. (8)-(9)) based on a suitable multi-line rate objective (MRO). For example, the MRO may be based on tradeoffs with respect to the peak performance of different lines. Example optimization goals may be to maximize the sum of rates, to maximize the minimum rates, and/or achieve a fairness-based objective (e.g., harmonic mean or proportional fairness). In one possible embodiment, the fixed precoder vector $V_0^{(k)}$ may be a weighted sum of the above-described precoder vectors $V_n^{(k)}$ over a full set or a selected subset of line indices n.

Figure 10:
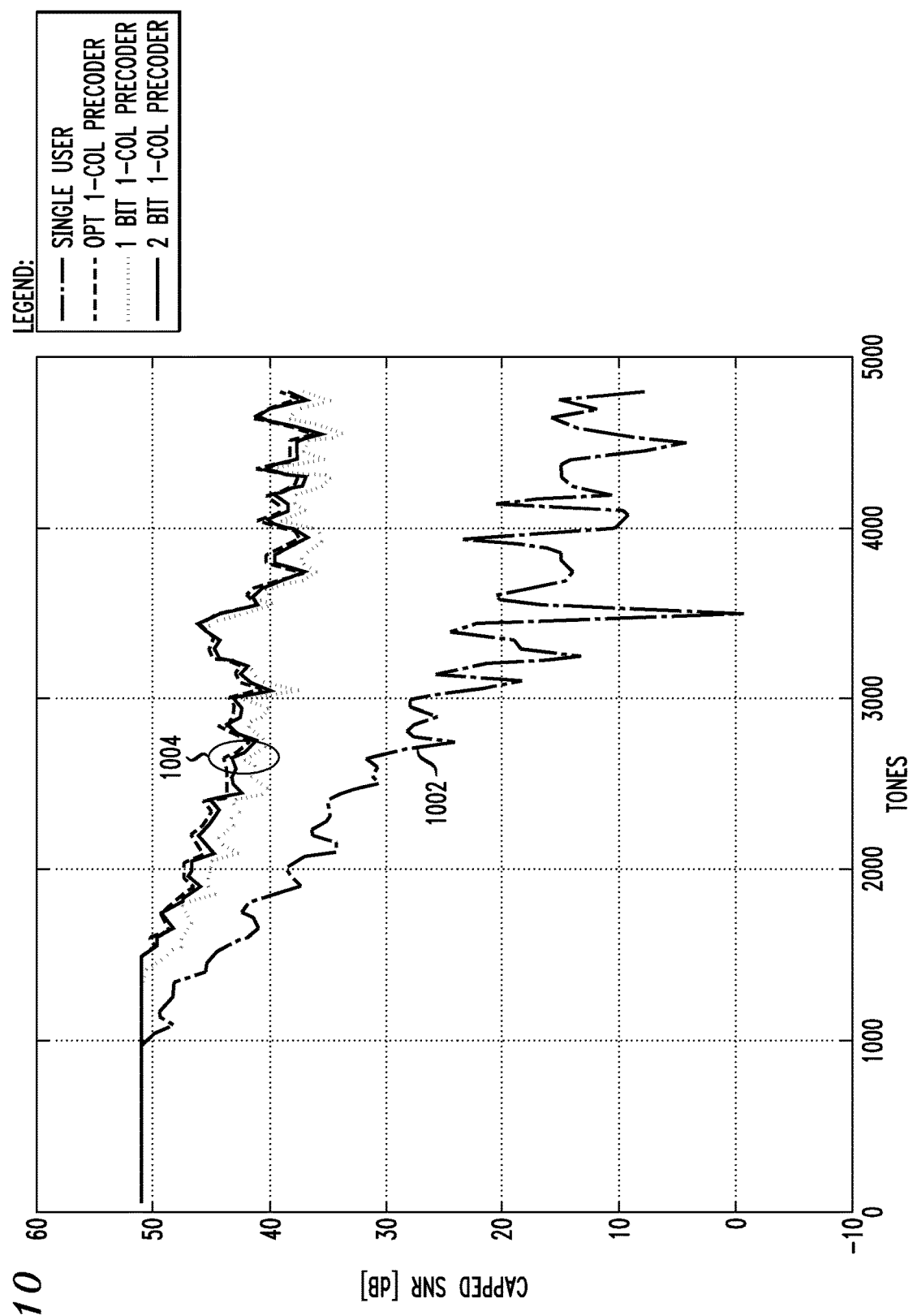
FIG. 10 graphically illustrates example SNR improvements that can be achieved in the communication system of FIG. 1 or 2 according to an embodiment.

FIG. 10 graphically illustrates example SNR improvements that can be achieved in system 100 or 200 according to an embodiment. More specifically, the results of FIG. 10 correspond to DPU 110 connected to nineteen subscriber lines 140, i.e., N=19. The configuration of DPU 110 is such that: (i) full N×N vectoring can be performed for tones whose tone indices k are smaller than 1500; and (ii) N×1 beamforming can be performed for the higher tone indices.

Curve 1002 provides a reference with respect to which the beamforming SNR gains can be evaluated. More specifically, curve 1002 shows the SNR values obtained on the direct line when only the corresponding single data transmitter is transmitting while the other data transmitters are silent (idle). A cluster of curves 1004 shows the SNR values obtained on the same line when beamforming is performed therefor using all nineteen data transmitters of DPU 110. Each curve in the cluster 1004 corresponds to a different respective configuration of DPU 110, as indicated in the legend shown in FIG. 10.

Therein, a first configuration (denoted as "opt 1-col precoder") is a configuration in which the components of the beamforming precoder vector are unrestricted, e.g., can take any complex value (subject to satisfying the power constraints) selected such as to achieve nearly optimal performance. As already indicated above, the corresponding vectoring engine needs to have a relatively high processing power to be able to process the requisite large volume of full-precision complex-value hardware multiplications.

A second configuration (denoted as "1-bit 1-col precoder") is a configuration in which the components of the beamforming precoder vector $V_n^{(k)}$ are restricted to the values from the set $\{1,-1\}$.

A third configuration (denoted as "2-bit 1-col precoder") is a configuration in which the components of the beamforming precoder vector $V_n^{(k)}$ are restricted to the values from the set $\{1,-1,j,-j\}$.

The tight clustering of the SNR curves in cluster 1004 indicates that the second and third configurations are capable of providing a level of performance that is very similar to that of the first configuration, i.e., the corresponding SNR degradation is relatively insignificant, e.g., less than 4 dB and 1 dB, respectively. However, the advantages of the second and third configurations with respect to the first configuration are that the second and third configurations can be implemented without the use of full-precision complex-value hardware multiplications and, as such, can be run on a significantly simpler and/or less powerful vectoring engine. The latter can advantageously be used to achieve significant component-cost savings while still being able to provide nearly optimal beamforming SNR gains.

FIG. 11 shows a block diagram of a multi-line receiver 1100 that can be used in a DPU 110 (FIGS. 1, 2) according to an embodiment. For example, receiver 1100 can be used to implement receivers 130$_1$-130$_N$ (FIG. 1). For illustration purposes and without any implied limitations, receiver 1100 is shown and described in reference to an example embodiment corresponding to N=4. From the provided description, a person of ordinary skill in the art will be able to make and use, without any undue experimentation, other embodiments, e.g., corresponding to other values of N.

As shown in FIG. 11, receiver 1100 comprises an AFE 1108, a DFE 1118, and a DSP 1130. In an example embodiment, receiver 1100 can be configured to operate using some of the methods described below in reference to FIG. 13.

AFE 1108 comprises line AFEs 1110$_1$-1110$_N$. Line AFE 1110$_1$ operates to convert a modulated electrical input signal 1102$_i$ received through a corresponding I/O port 138$_i$ into a corresponding analog electrical RF signal 1112$_i$ suitable for digitization in DFE 1118. The typical analog signal processing applied to input signal 1102$_i$ in AFE 1110$_i$ includes amplification and filtering.

DFE 1118 comprises line DFEs 1120$_1$-1120$_N$. Line DFE 1120$_i$ operates to sample signal 1112$_i$ at an appropriate sampling rate to generate a corresponding sequence 1122$_i$ of digital samples (values). In an example embodiment, line DFE 1120$_i$ comprises an ADC and other pertinent circuitry known to those skilled in the pertinent art.

In an example embodiment, DSP 1130 comprises demodulators 1140$_1$-1140$_N$, a postcoder 1144, symbol decoders 1150$_1$-1150$_N$, deframers 1160$_1$-1160$_N$, and decapsulation modules 1170$_1$-1170$_N$.

Demodulator 1140$_i$ uses a Fourier transform, as known in the pertinent art, to perform TD-to-FD signal conversion, thereby converting sequence 1122$_i$ into the corresponding sequence of FD symbols. Data signals 1142$_1$-1142$_N$ carrying the FD symbols generated in this manner are then applied to postcoder 1144. Postcoder 1144 operates to convert data signals 1142$_1$-1142$_N$ into data signals 1146$_1$-1146$_N$, e.g., as described in more detail below in reference to FIG. 12. In an example embodiment, different postcoding schemes may be applied by postcoder 1144 to different groups of tones. A controller 1180 is configured to appropriately control, by way of control signals 1182, 1184, 1186, and 1188, the operations of postcoder 1144, symbol decoders 1150$_1$-1150$_N$, deframers 1160$_1$-1160$_N$, and decapsulation modules 1170$_1$-1170$_N$ to properly control data flows from data signals 1142$_1$-1142$_N$ to data signals 1172$_1$-1172$_N$.

Symbol decoder 1150$_i$ applies constellation and carrier demapping to convert data signal 1146$_i$ into the corresponding data frame(s) 1152$_i$. Deframer 1160$_i$ then operates to extract the corresponding DTU 1162$_i$ from each data frame 1152$_i$, e.g., by removing the frame header(s) and performing other pertinent operations as known in the art. Decapsulation modules 1170$_1$-1170$_N$ then operate to extract payload data 1172$_1$-1172$_N$ from DTUs 1162$_1$-1162$_N$ and direct the extracted data to external circuits.

Figure 12:
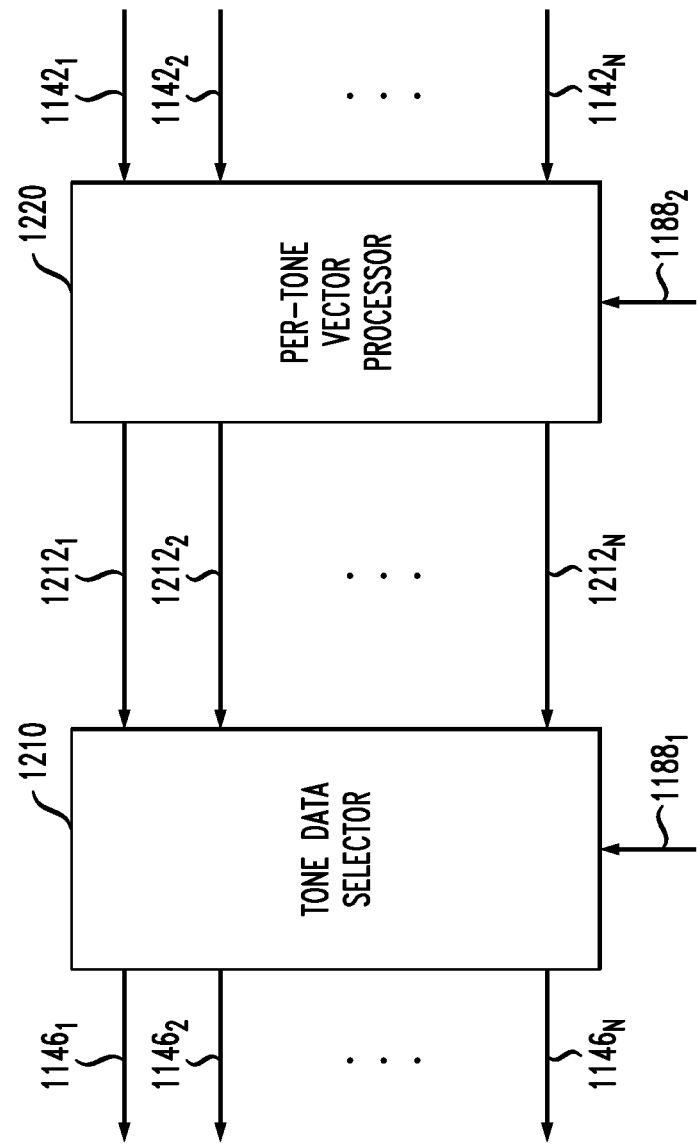
FIG. 12 shows a block diagram of a postcoder that can be used in the multi-line receiver of FIG. 11 according to an embodiment.

FIG. 12 shows a block diagram of postcoder 1144 according to an embodiment. Data signals 1142$_1$-1142$_N$ and 1146$_1$-1146$_N$ and control signal(s) 1188 are also shown in FIG. 12 to better illustrate the relationship between the circuits of FIGS. 11 and 12.

As shown in FIG. 12, postcoder 1144 comprises a data selector 1210 and a vector processor 1220.

Control signal 1188$_2$ controls the configuration of vector processor 1220, which determines the manner in which the digital values supplied by data signals 1142$_1$-1142$_N$ are processed therein.

For example, when vector processor 1220 operates to process the signals corresponding to a tone from the corresponding first subset of tones, control signal 1188$_2$ configures the vector processor to convert the vector input received via data signals 1142$_1$-1142$_N$ into a corresponding vector output for data signals 1212$_1$-1212$_N$ in accordance with Eq. (13):

$$D^{(k)}=P^{(k)}C^{(k)} \qquad (13)$$

where $D^{(k)}$ is the output vector of values generated by vector processor 1220 for data signals 1212$_1$-1212$_N$; $P^{(k)}$ is the postcoder matrix; $C^{(k)}$ is the input vector of values provided by data signals 1142$_1$-1142$_N$; and k is the tone index. Each of the vectors $C^{(k)}$ and $D^{(k)}$ has N components, which can generally be complex-valued. The postcoder matrix $P^{(k)}$ is an N×N matrix. In an example embodiment, the matrix elements of the postcoder matrix $P^{(k)}$ are complex values selected such that the interline interference for the k-th tone is significantly reduced or canceled. Example methods that can be used to determine the matrix elements of the postcoder matrix $P^{(k)}$ are described, e.g., in the above-cited U.S. patent application Ser. No. 16/246,989.

When vector processor 1220 operates to process the signals corresponding to a tone from the corresponding second subset of tones, control signal 1188$_2$ configures the vector processor to convert the received vector input $C^{(k)}$ into a corresponding scalar output $a_n^{(k)}$ for data signal 1212$_n$ using the dot product of the vectors $C^{(k)}$ and $U_n^{(k)}$ computed in accordance with Eq. (14):

$$a_n^{(k)}=U_n^{(k)} \cdot C^{(k)} \qquad (14)$$

where $U_n^{(k)}$ is the postcoder vector; and n is the line index, e.g., n∈{1, . . . , N}. Herein, the vectors $C^{(k)}$ and $U_n^{(k)}$ can be in the form of, e.g., column and row vectors, respectively. The scalar output $a_n^{(k)}$ is generally complex-valued. The postcoder vector $U_n^{(k)}$ has N components. In an example embodiment, the vector elements of the postcoder vector $U_n^{(k)}$ can be complex values selected such that virtual beamforming is performed on the k-th tone for the remote data transmitter connected to subscriber line 140$_n$.

Note that the first and second subsets of tones used herein may or may not be the same as the first and second subsets of tones described above in reference to FIG. 5. In other words, the tones may be sorted differently for upstream and downstream communications.

In at least some embodiments, the vector elements of the postcoder vector $U_n^{(k)}$ can be restricted to the values from the set $\{1,-1\}$ or from the set $\{1,-1,j,-j\}$ that can be represented with one or two bits, respectively, and for which the processing of the vector input to the scalar output can be implemented using plain sign changes and/or swaps of the real and imaginary parts of the complex input values.

In at least some embodiments, the vector elements of the postcoder vector $U_n^{(k)}$ can be restricted to the values from the set $\{0,1,-1\}$ or from the set $\{0,1,-1,j,-j\}$. The effect of the inclusion of 0 into the possible values is that the resulting virtual beamforming can be implemented to more closely approach the performance of optimal maximum ratio combining (MRC).

For the tones belonging to the second subset of tones, controller 1180 may also be used to generate a control signal 1190 (see FIG. 11) for the remote data transmitters such that only one of said remote data transmitters is allowed to transmit at a time on that particular tone while the other remote data transmitters remain silent on that same tone at that same time. Control signal 1190 generated in this manner thus determines the value of n in the tone-dependent manner, i.e., n=n(k). Control signal $1188_2$ can then be used to communicate the tone-dependent values of n(k) to vector processor 1220 so that an appropriate one of the postcoder vectors $U_n^{(k)}$ can be invoked therein.

Control signal $1188_1$ controls the configuration of data selector 1210, which determines how the digital values supplied by data signals $1212_1$-$1212_N$ are passed through by the data selector. For example, if the tone belongs to the first subset, then control signal $1188_1$ causes data selector 1210 to pass one value from each of data signals $1212_1$-$1212_N$. If the tone belongs to the second subset, then control signal $1188_1$ causes data selector 1210 to select and pass through a single value from data signal $1212_n$, which carries the scalar output $a_n^{(k)}$ computed by vector processor 1220 in accordance with Eq. (14).

Figure 13:
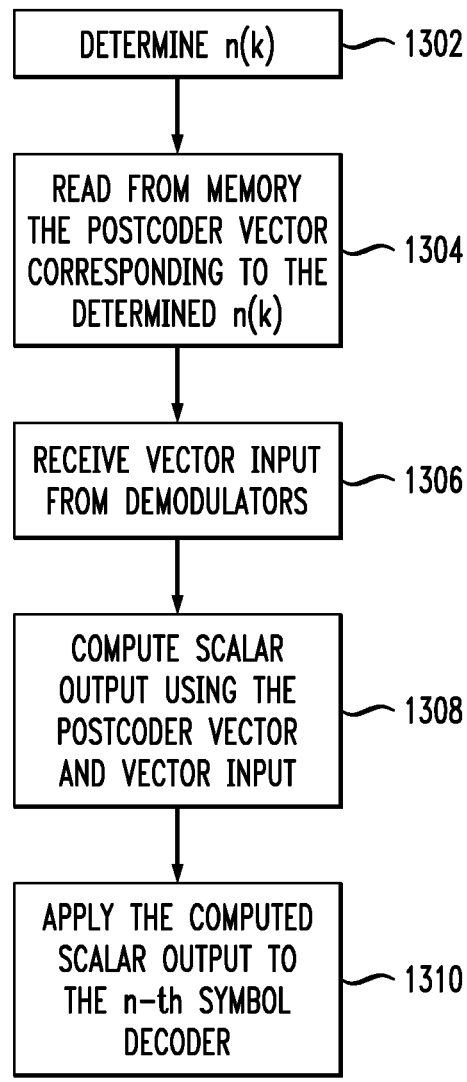
FIG. 13 shows a flowchart of a processing method that can be used in the postcoder of FIG. 12 according to an embodiment.

FIG. 13 shows a flowchart of a processing method 1300 that can be used in postcoder 1144 according to an embodiment. Method 1300 can be used, e.g., to process the signals corresponding to a tone from the second subset of tones.

At step 1302 of method 1300, the value of the line index n(k) is determined. As already indicated above, this line-index value identifies the remote data transmitter that is allowed to transmit in the particular time slot and for which the beamforming postcoding is going to be performed. Appropriate control signals $1188_1$ and $1188_2$ are generated to communicate the determined line-index value to postcoder 1144 (also see FIGS. 11-12).

At step 1304, vector processor 1220 retrieves from the memory the postcoder vector $U_n^{(k)}$ corresponding to the line index n(k) of step 1302. In an example embodiment, each of the vector components of the postcoder vector $U_n^{(k)}$ has a value that belongs to the set $\{1,0,-1\}$ or $\{1,0,-1,j,-j\}$.

At step 1306, vector processor 1220 receives the input vector $C^{(k)}$ via data signals $1142_1$-$1142_N$. Input vector $C^{(k)}$ generally has N non-zero components despite the fact that only the n-th data transmitter transmits in the corresponding time slot. While the n-th component of the input vector $C^{(k)}$ (which corresponds to the direct line) is typically dominant, at least some of the other components may carry non-negligible signals generated due to the inter-line crosstalk and/or coupling.

At step 1308, vector processor 1220 computes the scalar output $a_n^{(k)}$ for data signal $1212_n$ in accordance with Eq. (14) using the postcoder vector $U_n^{(k)}$ of step 1304 and the input vector $C^{(k)}$ of step 1306.

At step 1310, data selector 1210 transfers the scalar value $a_n^{(k)}$ computed at step 1308 from data signal $1212_n$ to data signal $1146_n$. Data selector 1210 does not typically transfer any values to any other data signals 1146 in this time slot for this tone.

Figure 14:
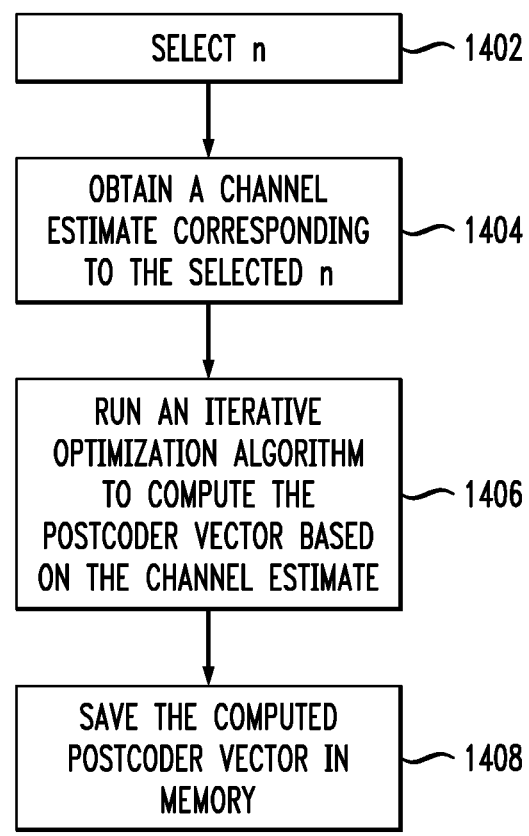
FIG. 14 shows a flowchart of a communication method that can be used to configure the postcoder of FIG. 12 according to an embodiment.

FIG. 14 shows a flowchart of a communication method 1400 that can be used to configure postcoder 1144 according to an embodiment. More specifically, method 1400 is directed at determining the postcoder vector $U_n^{(k)}$ that can then be used at steps 1304 and 1308 of method 1300. For illustration purposes and without any implied limitations, method 1400 is described for a single selected value of the tone index k corresponding to the second subset of tones. A person of ordinary skill in the art will understand, without any undue experimentation, how to apply method 1400 to more than one tone from the second subset of tones.

At step 1402 of method 1400, a value of the line index n is selected. The selected line-index value identifies the remote data transmitter for which the beamforming postcoding is going to be performed. In different instances of step 1402, different respective line-index values may be selected.

At step 1404, a sequence of pilot (e.g., calibration) signals is applied to lines $140_1$-$140_N$ in the upstream direction and the corresponding signals received by data receivers $130_1$-$130_N$ are measured at DPU 110. The measurement results are then processed to obtain an estimate of the channel for transmissions from data transmitter $160_n$ to DPU 110. In an example embodiment, the channel estimate may have a form of a complex-valued vector $H_n^{(k)}$ having N components. The computed vector $H_n^{(k)}$ is saved in the memory, e.g., for the subsequent use at step 1406.

At step 1406, an iterative algorithm is run to compute the postcoder vector $U_n^{(k)}$ based on the channel vector $H_n^{(k)}$ determined at step 1406. The postcoder vector $U_n^{(k)}$ can only have components selected from the set $\{1,0,-1\}$, or from the set $\{1,0,-1,j,-j\}$, or components obtained by multiplying an element of one of these sets by a scaling coefficient s of the form $s=2^{-m}$ (where m=0, 1, . . . , M; and M is a positive integer) or by zero. The iterative algorithm is generally designed and configured to select the different components of the postcoder vector $U_n^{(k)}$ such that the use of the resulting postcoder vector $U_n^{(k)}$ at step 1308 of method 1300 results in nearly optimal constructive combination of the signals received by data receivers $130_1$-$130_N$ from data transmitter $160_n$.

An example embodiment of step 1406 is described in more detail below in reference to FIG. 15. A person of ordinary skill in the art will be able to modify the example iterative algorithm for the specific intended system configuration. For example, some of the optimization criteria and/or constrains may be modified as appropriate or necessary.

At step 1408, the postcoder vector $U_n^{(k)}$ computed at step 1406 is saved in the memory for the subsequent use, e.g., at step 1308 of method 1300.

Figure 15:
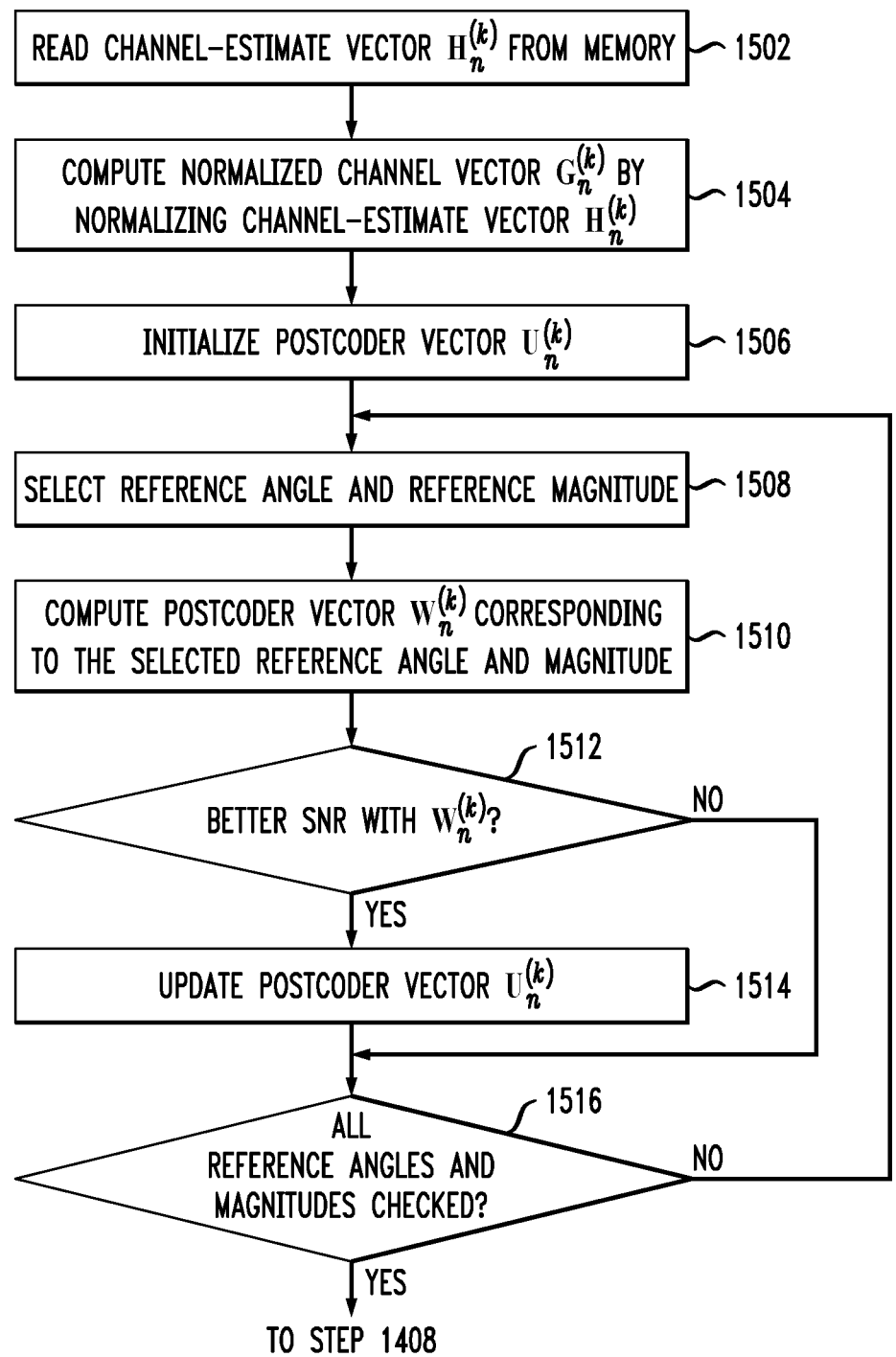
FIG. 15 shows a flowchart of an iterative algorithm that can be used in the communication method of FIG. 14 according to an embodiment.

FIG. 15 shows a flowchart of an iterative algorithm that can be used to implement step 1406 of method 1400 according to an embodiment.

In an example embodiment, the iterative algorithm can be configured to heuristically solve the following optimization problem:

$$\forall k, n: \max_{\{p_{i,n}^{(k)} \in \{1,-1,j,-j\}, s_{i,n}^{(k)} \in \{1,2^{-1},2^{-2},\ldots,2^{-M},0\}\}} \log_2 \quad (15)$$

-continued $$\left\{ 1 + \frac{1}{\Gamma} \frac{|\sum_i H_{n,i}^{(k)} s_{i,n}^{(k)} p_{i,n}^{(k)}|^2 \sigma_{n,n}^{(k)}}{|\sum_i s_{i,n}^{(k)} p_{i,n}^{(k)}|^2 \sigma_i^{(k)}} \right\}$$

where $U_{i,n}^{(k)} = s_{i,n}^{(k)} p_{i,n}^{(k)}$ is the i-th component of the postcoder vector $U_n^{(k)}$; $H_n^{(k)}$ is the i-th component of the channel-estimate vector $H_n^{(k)}$; $\Gamma$ is the applicable gap to Shannon capacity; $\sigma_{nmn}^{(k)} = s_{i,n}^{(k)} p_{i,n}^{(k)}$ the transmit signal power corresponding to the n-th transmitter; and $\sigma_i^{(k)}$ is the receiver noise power corresponding to the i-th receiver.

Alternatively, the optimization problem of Eq. (15) can be presented as follows:

$$\forall k, n: \max_{\{p_{i,n}^{(k)} \in \{1,-1,j,-j\}, s_{i,n}^{(k)} \in \{1, 2^{-1}, 2^{-2}, \ldots, 2^{-M}, 0\}\}} \frac{|\sum_i H_{n,i}^{(k)} s_{i,n}^{(k)} p_{i,n}^{(k)}|^2}{\sum_i |s_{i,n}^{(k)} p_{i,n}^{(k)}|^2 \sigma_i^{(k)}} \quad (16)$$

In some embodiments, the allowed values of $p_{i,n}^{(k)}$ used in the max functions of Eqs. (15)-(16) can be changed to $p_{i,n}^{(k)} \in \{1,-1\}$.

An example embodiment of the iterative algorithm that can be used to find an approximate solution of either of these optimization problems is described below.

Note that if $u_{i,n}^{(k)}$ were allowed to take any value, then the postcoder vector $U_n^{(k,opt)}$ that optimizes Eq. (16) would be in the form given by Eq. (17):

$$u_{i,n}^{(k,opt)} = \frac{\overline{H_{n,i}^{(k)}}}{\sigma_i^{(k)}} \quad (17)$$

Since the objective in Eq. (16) is scale-invariant, any postcoder vector of the form $\beta e^{j\alpha} U_u^{(k,opt)}$ is also optimal, where a is an arbitrary angle in radians and $\beta$ is an arbitrary magnitude. The solution given by Eq. (17) is sometimes referred to in the pertinent literature as the maximum ratio combining (MRC). Hence, one possible heuristic that can be used assumes solutions of this form and, for a given $\alpha$ and $\beta$, maps each vector element $\beta e^{j\alpha} u_{i,n}^{(k,opt)}$ to the nearest element of the form $u_{i,n}^{(k)} = s_{i,n}^{(k)} p_{i,n}^{(k)}$, where $p_{i,n}^{(k)} \in \{1,-1, j,-j\}$ or $\{1,-1\}$ and $s_{i,n}^{(k)} \in \{1, 2^{-1}, 2^{-2}, \ldots, 2^{-M}, 0\}$, as described below.

At sub-step 1502 of step 1406, the channel-estimate vector $H_n^{(k)}$ computed at step 1404 is read from the memory.

At sub-step 1504, normalized channel vector $G_n^{(k)}$ is computed by dividing each component of the channel-estimate vector $H_n^{(k)}$ by $H_{n,n}^{(k)}$. Herein, the individual components of the normalized channel vector $G_n^{(k)}$ are denoted $G_{n,i}^{(k)}$, where i=1, . . . , N.

In some embodiments, step 1504 may be optional or not present.

At sub-step 1506, the postcoder vector $U_n^{(k)}$ is initialized to provide a starting point for the subsequent iterative changes. For example, one possible initialization may set each component $p_{i,n}^{(k)}$ and $s_{i,n}^{(k)}$ to one, i.e., $p_{i,n}^{(k)} = 1$ and $s_{i,n}^{(k)} = 1$ for each i. Alternative initialization schemes may also be used, provided that the initial choices of different components $p_{i,n}^{(k)}$ are restricted to the values from the set $\{1,-1\}$, or from the set $\{1,-1,j,-j\}$, and the that the initial choices of $s_{i,n}^{(k)}$ are restricted to the set $\{1, 2^{-1}, 2^{-2}, \ldots, 2^{-M}, 0\}$, for some selected M.

At sub-step 1508, a reference angle $\alpha$ and a reference magnitude $\beta$ are selected.

In an example embodiment, the reference angle $\alpha$ can be selected from a set of discrete reference angles from the range between 0 and 90 degrees (=$\pi/2$ radians). The set of reference angles may contain angle values that sample this range with a selected granularity. Non-uniform sampling may also be used. In some embodiments, a single reference angle $\alpha_0$ may be considered, e.g., the reference angle $\alpha_0$ that is the angle of $H_{n,n}^{(k)}$ on the direct line from the n-th remote data transmitter.

In an example embodiment, the reference magnitude $\beta$ can be selected from a discrete set of reference magnitudes. For example, reference magnitudes from the range between $\beta_0/2$ and $2\beta_0$ may be selected, where $\beta_0$ is defined by Eq. (18) as follows:

$$\beta_0 = \frac{1}{\max_i \left| \frac{\overline{H_{n,i}^{(k)}}}{\sigma_i^{(k)}} \right|} \quad (18)$$

In some embodiments, a single reference magnitude may be considered.

At sub-step 1510, a postcoder vector $W_n^{(k)}$ corresponding to the reference angle $\alpha$ and reference magnitude $\beta$ selected at sub-step 1508 is computed. More specifically, different components $w_{i,n}^{(k)}$ of the precoder vector $W_n^{(k)}$ are formed as $w_{i,n}^{(k)} = s_{i,n}^{(k)} p_{i,n}^{(k)}$, where $p_{i,n}^{(k)}$ is selected from the set $\{1,-1,j,-j\}$ or $\{1,-1\}$ and sin is selected from the set $\{1, 2^{-1}, 2^{-2}, \ldots, 2^{-M}, 0\}$, such as to approximately align the postcoder vector $W_n^{(k)}$ with a scaled version of the optimal vector $U_n^{(k,opt)}$. In mathematical terms, the corresponding per-component selection criterion can be expressed as follows:

$$\forall i: \operatorname*{argmin}_{\{p_{i,n}^{(k)} \in \{1,-1,j,-j\}, s_{i,n}^{(k)} \in \{1, 2^{-1}, 2^{-2}, \ldots, 2^{-M}, 0\}\}} |s_{i,n}^{(k)} p_{i,n}^{(k)} - \beta e^{j\alpha} u_{i,n}^{(k,opt)}| \quad (19)$$

This criterion can further be reformulated as two independent sub-problems expressed by Eqs. (20) and (21), respectively:

$$\forall i: \hat{p}_{i,n}^{(k)} \operatorname*{argmin}_{\{p_{i,n}^{(k)} \in \{1,-1,j,-j\}\}} |\operatorname{angle}(H_{i,n}^{(k)} p_{i,n}^{(k)}) - \alpha| \quad (20)$$

$$\forall i: \hat{s}_{i,n}^{(k)} \operatorname*{argmin}_{\{s_{i,n}^{(k)} \in \{1, 2^{-1}, 2^{-2}, \ldots, 2^{-M}, 0\}\}} |s_{i,n}^{(k)} - \operatorname{real}\{(\hat{p}_{i,n}^{(k)})^{-1} \beta e^{j\alpha} u_{i,n}^{(k,opt)}\}| \quad (21)$$

where angle(x) denotes an angle corresponding to the complex value x on the complex plane, and real(x) denotes the real part of a complex value x.

In some embodiments, the allowed values of $p_{i,n}^{(k)}$ used in the argmin functions of Eqs. (19)-(20) can be changed to $p_{i,n}^{(k)} \in \{1,-1\}$.

At sub-step 1512, the SNR resulting from the postcoder vector $W_n^{(k)}$ computed at sub-step 1510 is compared with that of the postcoder vector $U_n^{(k)}$. In an example embodiment, the comparison can be performed by defining the SNR function $\gamma_n^{(k)}(U)$, e.g., using Eq. (22):

$$\gamma_n^{(k)}(U) = \frac{|\sum_i H_{n,i}^{(k)} u_i|^2}{\sum_i |u_i|^2 \sigma_i^{(k)}} \quad (22)$$

and then evaluating the inequality given by Eq. (23):

$$\gamma_n^{(k)}(W_n^{(k)}) > \gamma_n^{(k)}(U_n^{(k)}) \quad (23)$$

If the inequality of Eq. (23) is satisfied, then the processing is directed to sub-step 1514. Otherwise, the processing is directed to sub-step 1516.

At sub-step 1514, the previous version of the postcoder vector $U_n^{(k)}$ is replaced by a better-performing version in accordance with Eq. (24):

$$U_n^{(k)} = W_n^{(k)} \quad (24)$$

A person of ordinary skill in the art will readily recognize that sub-step 1514 provides iterative updates of the postcoder vector $U_n^{(k)}$ directed at improving the beamforming performance of postcoder 1144.

Sub-step 1516 controls the exit from the processing loop 1508-1516. More specifically, if all reference angles α and reference magnitudes β have been checked, then the optimization processing exits the loop, and step 1406 is terminated. Otherwise, the optimization processing continues by being redirected back to sub-step 1508.

According to an example embodiment disclosed above, e.g., in the summary section and/or in reference to any one or any combination of some or all of FIGS. 1-15, provided is an apparatus comprising: a data transmitter (e.g., 110, FIG. 1) that comprises an analog front end (e.g., 568, FIG. 5) connectable to proximal ends of a plurality of subscriber lines (e.g., 140, FIG. 1) and a digital signal processor (e.g., 510, FIG. 5) configured to drive the analog front end to cause a plurality of output signals to be transmitted on the subscriber lines using frequency-division multiplexing; wherein the digital signal processor comprises a vector processor (e.g., 620, FIG. 6) configured to: for a first tone, generate a plurality of first precoded data signals (546₁-546ₙ, FIG. 6) by applying a plurality of weighting factors (e.g., $V_n^{(k)}$, Eq. (2)) to a value (e.g., $a_n^{(k)}$, Eq. (2)) being communicated to a data receiver at a distal end of a selected one of the subscriber lines; and drive the analog front end to apply each of the first precoded data signals to a respective one of the subscriber lines; wherein the first precoded data signals that are applied to the subscriber lines other than the selected one of the subscriber lines are coupled to the selected one of the subscriber lines by way of interline crosstalk on the first tone; wherein the weighting factors are selected such as to cause constructive interference of the first precoded data signals received by the data receiver, each of the weighting factors being represented by a one-bit value, a two-bit value, or a three-bit value.

In some embodiments of the above apparatus, each of the weighting factors is represented by a respective one-bit value.

In some embodiments of any of the above apparatus, each of the weighting factors is represented by a respective two-bit value.

In some embodiments of any of the above apparatus, each of the weighting factors is represented by a respective three-bit value.

In some embodiments of any of the above apparatus, at least some of the weighting factors are complex-valued.

In some embodiments of any of the above apparatus, each of the weighting factors is selected from a set consisting of 1 and −1.

In some embodiments of any of the above apparatus, each of the weighting factors is selected from a set consisting of 1, −1, j, and −j.

In some embodiments of any of the above apparatus, each of the weighting factors is selected from a set consisting of 0, 1, −1, j, and −j.

In some embodiments of any of the above apparatus, each of the weighting factors is selected from a set consisting of 0, 1, and −1.

In some embodiments of any of the above apparatus, the vector processor is configured to apply any of the weighting factors to the value without performing a hardware multiplication operation.

In some embodiments of any of the above apparatus, the vector processor is configured to apply any of the weighting factors to the value using one or more operations from a set comprising: a sign-bit change; a swap of real and imaginary parts of a complex value; and setting a value to zero.

In some embodiments of any of the above apparatus, the vector processor is further configured to generate, for a second tone, a plurality of second precoded data signals (546₁-546ₙ, FIG. 5) by applying a vector-to-vector transformation to a plurality of values (e.g., in accordance with Eq. (1)), each of the plurality of values being communicated to a respective data receiver at a distal end of a respective one of the subscriber lines, the vector-to-vector transformation being configured to cause effects of interline crosstalk on the second tone to be substantially mitigated at the respective data receivers.

In some embodiments of any of the above apparatus, the data transmitter is configured to transmit data on a plurality of first tones and a plurality of second tones.

In some embodiments of any of the above apparatus, each of the first tones has a higher frequency than any of the second tones.

In some embodiments of any of the above apparatus, the apparatus further comprises an additional processor (e.g., 214, FIG. 2) in communication with the digital signal processor by way of an optical link (e.g., 202, FIG. 2), the additional processor being configured to perform some of computations that enable the digital signal processor to drive the analog front end and to cause the plurality of output signals to be transmitted on the subscriber lines.

In some embodiments of any of the above apparatus, the additional processor and the digital signal processor are configured to generate, for a second tone, a plurality of second precoded data signals (546₁-546ₙ, FIG. 5) by applying a vector-to-vector transformation to a plurality of values (e.g., in accordance with Eq. (1)), each of the plurality of values being communicated to a respective data receiver at a distal end of a respective one of the subscriber lines, the vector-to-vector transformation being configured to cause effects of interline crosstalk on the second tone to be substantially mitigated at the respective data receivers.

In some embodiments of any of the above apparatus, the apparatus further comprises an electronic controller (e.g., 580, FIG. 5) configured to control flows of data through the digital signal processor such that, during a given symbol period, the first tone carries data corresponding to a single subscriber.

In some embodiments of any of the above apparatus, the digital signal processor further comprises a plurality of encapsulation modules (e.g., 520, FIG. 5), a plurality of framers (e.g., 530, FIG. 5), a plurality of symbol encoders (e.g., 540, FIG. 5), and a plurality of modulators (e.g., 550, FIG. 5) connected to the vector processor.

In some embodiments of any of the above apparatus, the vector processor is configured to generate the plurality of first precoded data signals for the first tone by also applying a plurality of scaling coefficients (e.g., $s_{i,n}^{(k)} \in \{1, 2^{-1}, 2^{-2}, \ldots, 2^{-M}, 0\}$) to the value being communicated to the data receiver; and wherein at least some of the scaling coefficients are expressed as $2^{-m}$, where m is a respective positive integer.

In some embodiments of any of the above apparatus, each of the scaling coefficients is real-valued.

In some embodiments of any of the above apparatus, the vector processor is configured to apply said at least some of the scaling coefficients to the value using respective bit-shift operations.

According to another example embodiment disclosed above, e.g., in the summary section and/or in reference to any one or any combination of some or all of FIGS. 1-15, provided is an apparatus comprising: a data receiver (e.g., 110, FIG. 1) that comprises an analog front end (e.g., 1108, FIG. 11) and a digital signal processor (e.g., 1130, FIG. 11) configured to process digital samples corresponding to a plurality of input signals received by the analog front end at input ports connectable to proximal ends of a corresponding plurality of subscriber lines (e.g., 140, FIG. 1), the input signals being received in response to data signals applied to distal ends of the subscriber lines, the data signals having been encoded with data using frequency-division multiplexing; wherein the digital signal processor comprises a vector processor (e.g., 1220, FIG. 12) configured to generate, for a first tone, an output value (e.g., $a_n^{(k)}$, Eq. (14)) by computing a weighted sum of input values (e.g., $C^{(k)}$, Eq. (14)), each of the input values corresponding to the first tone of a respective one of the input signals, the weighted sum being computed using a plurality of weighting factors (e.g., $U_n^{(k)}$, Eq. (14)), the first tones of the input signals being received in response to a single one of the data signals, the single one of the data signals having been coupled to multiple ones of the subscriber lines by way of interline crosstalk on the first tone; and wherein the weighting factors are selected such as to cause addends of the weighted sum to add substantially constructively, each of the weighting factors being represented by a one-bit value, a two-bit value, or a three-bit value.

In some embodiments of the above apparatus, each of the weighting factors is represented by a respective one-bit value.

In some embodiments of any of the above apparatus, each of the weighting factors is represented by a respective two-bit value.

In some embodiments of any of the above apparatus, each of the weighting factors is represented by a respective three-bit value.

In some embodiments of any of the above apparatus, at least some of the weighting factors are complex-valued.

In some embodiments of any of the above apparatus, each of the weighting factors is selected from a set consisting of 1 and −1.

In some embodiments of any of the above apparatus, each of the weighting factors is selected from a set consisting of 1, 0, and −1.

In some embodiments of any of the above apparatus, each of the weighting factors is selected from a set consisting of 1, −1, j, and −j.

In some embodiments of any of the above apparatus, each of the weighting factors is selected from a set consisting of 1, 0, −1, j, and −j.

In some embodiments of any of the above apparatus, the vector processor is configured to apply any of the weighting factors to the input values without performing a hardware multiplication operation.

In some embodiments of any of the above apparatus, the vector processor is configured to apply any of the weighting factors to the input values using one or more operations from a set comprising: a sign-bit change; a swap of real and imaginary parts of a complex value; and setting a value to zero.

In some embodiments of any of the above apparatus, the data receiver is configured to receive data on a plurality of first tones.

In some embodiments of any of the above apparatus, the vector processor is configured to compute the weighted sum for the first tone by also applying respective scaling coefficients (e.g., $s_{i,n}^{(k)} \in \{1, 2^{-1}, 2^{-2}, \ldots, 2^{-M}, 0\}$) to at least some components of the weighted sum; and wherein at least some of the respective scaling coefficients are expressed as $2^{-m}$, where m is a respective positive integer.

In some embodiments of any of the above apparatus, each of the scaling coefficients is real-valued.

In some embodiments of any of the above apparatus, the vector processor is configured to apply said at least some of the respective scaling coefficients using respective bit-shift operations.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As used herein and in the claims, the term "provide" with respect to a system, device, or component encompasses designing or fabricating the system, device, or component; causing the system, device, or component to be designed or fabricated; and/or obtaining the system, device, or component by purchase, lease, rental, or other contractual arrangement.

What is claimed is:

1. An apparatus comprising a data transmitter that comprises an analog front end connectable to proximal ends of a plurality of subscriber lines and a digital signal processor configured to drive the analog front end to cause a plurality of output signals to be transmitted on the subscriber lines using frequency-division multiplexing;
   wherein the digital signal processor comprises a vector processor configured to:
      for a first tone, generate a plurality of first precoded data signals by applying a plurality of weighting factors to a value being communicated to a data receiver at a distal end of a selected one of the subscriber lines; and
      drive the analog front end to apply each of the first precoded data signals to a respective one of the subscriber lines;
   wherein the first precoded data signals that are applied to the subscriber lines other than the selected one of the subscriber lines are coupled to the selected one of the subscriber lines by way of interline crosstalk on the first tone;
   wherein the weighting factors are selected such as to cause constructive interference of the first precoded data signals received by the data receiver, each of the weighting factors being represented by a one-bit value, a two-bit value, or a three-bit value; and
   wherein the signal processor further comprises a plurality of symbol encoders and a data selector configured to select for a given symbol period a single symbol value from a plurality of symbol values generated by the symbol encoders and apply said single symbol value to the vector processor, said single symbol value being the value communicated to the data receiver in the given symbol period.

2. The apparatus of claim 1, wherein each of the weighting factors is selected from a set consisting of 1 and −1.

3. The apparatus of claim 1, wherein each of the weighting factors is selected from a set consisting of 1, −1, j, and −j.

4. The apparatus of claim 1, wherein each of the weighting factors is selected from a set consisting of 0, 1, −1, j, and −j.

5. The apparatus of claim 1, wherein each of the weighting factors is selected from a set consisting of 0, 1, and −1.

6. The apparatus of claim 1, wherein the vector processor is configured to apply any of the weighting factors to the value without performing a hardware multiplication operation.

7. The apparatus of claim 1, wherein the vector processor is configured to apply any of the weighting factors to the value using one or more operations from a set comprising:
a sign-bit change;
a swap of real and imaginary parts of a complex value; and
setting a value to zero.

8. The apparatus of claim 1, wherein the vector processor is further configured to generate, for a second tone, a plurality of second precoded data signals by applying a vector-to-vector transformation to a plurality of values, each of the plurality of values being communicated to a respective data receiver at a distal end of a respective one of the subscriber lines, the vector-to-vector transformation being configured to cause effects of interline crosstalk on the second tone to be substantially mitigated at the respective data receiver.

9. The apparatus of claim 8, wherein the data transmitter is configured to transmit data on a plurality of first tones and a plurality of second tones.

10. The apparatus of claim 9, wherein each of the first tones has a higher frequency than any of the second tones.

11. The apparatus of claim 1, further comprising an additional processor in communication with the digital signal processor by way of an optical link, the additional processor being configured to perform some of computations that enable the digital signal processor to drive the analog front end and to cause the plurality of output signals to be transmitted on the subscriber lines.

12. The apparatus of claim 11, wherein the additional processor and the digital signal processor are configured to generate, for a second tone, a plurality of second precoded data signals by applying a vector-to-vector transformation to a plurality of values, each of the plurality of values being communicated to a respective data receiver at a distal end of a respective one of the subscriber lines, the vector-to-vector transformation being configured to cause effects of interline crosstalk on the second tone to be substantially mitigated at the respective data receivers.

13. The apparatus of claim 1, further comprising an electronic controller configured to control flows of data through the digital signal processor such that, during a given symbol period, the first tone carries data corresponding to a single subscriber.

14. The apparatus of claim 1, wherein the digital signal processor further comprises a plurality of encapsulation modules, a plurality of framers, a plurality of symbol encoders, and a plurality of modulators connected to the vector processor.

15. An apparatus comprising a data receiver that comprises an analog front end and a digital signal processor configured to process digital samples corresponding to a plurality of input signals received by the analog front end at input ports connectable to proximal ends of a corresponding plurality of subscriber lines, the input signals being received in response to data signals applied to distal ends of the subscriber lines, the data signals having been encoded with data using frequency-division multiplexing;
wherein the digital signal processor comprises a vector processor configured to generate, for a first tone, an output value by computing a weighted sum of input values, each of the input values corresponding to the first tone of a respective one of the input signals, the weighted sum being computed using a plurality of weighting factors, the input signals on the first tone thereof being received in response to a single one of the data signals, the single one of the data signals having been coupled to multiple ones of the subscriber lines by way of interline crosstalk on the first tone;
wherein the weighting factors are selected such as to cause addends of the weighted sum to add constructively, each of the weighting factors being represented by a one-bit value, a two-bit value, or a three-bit value; and
wherein the signal processor further comprises a plurality of symbol decoders and a data selector configured to apply the weighted sum to a selected one of the symbol decoders in a given symbol period, the weighted sum being an only value for the first tone passed by the data selector from the vector processor to the plurality of symbol decoders in the given symbol period.

16. The apparatus of claim 15, wherein each of the weighting factors is selected from a set consisting of 1 and −1.

17. The apparatus of claim 15, wherein each of the weighting factors is selected from a set consisting of 1, 0, and −1.

18. The apparatus of claim 15, wherein each of the weighting factors is selected from a set consisting of 1, −1, j, and −j.

19. The apparatus of claim 15, wherein each of the weighting factors is selected from a set consisting of 1, 0, −1, j, and −j.

20. The apparatus of claim 15, wherein the vector processor is configured to apply any of the weighting factors to the input values without performing a hardware multiplication operation.

21. The apparatus of claim 15, wherein the vector processor is configured to apply any of the weighting factors to the input values using one or more operations from a set comprising:
a sign-bit change;
a swap of real and imaginary parts of a complex value; and
setting a value to zero.

22. The apparatus of claim 15, wherein the data receiver is configured to receive data on a plurality of first tones.

23. An apparatus comprising a data transmitter that comprises an analog front end connectable to proximal ends of a plurality of subscriber lines and a digital signal processor configured to drive the analog front end to cause a plurality of output signals to be transmitted on the subscriber lines using frequency-division multiplexing;
wherein the digital signal processor comprises a vector processor configured to:

for a first tone, generate a plurality of first precoded data signals by applying a plurality of weighting factors to a value being communicated to a data receiver at a distal end of a selected one of the subscriber lines; and drive the analog front end to apply each of the first precoded data signals to a respective one of the subscriber lines;

wherein the first precoded data signals that are applied to the subscriber lines other than the selected one of the subscriber lines are coupled to the selected one of the subscriber lines by way of interline crosstalk on the first tone;

wherein the weighting factors are selected such as to cause constructive interference of the first precoded data signals received by the data receiver, each of the weighting factors being represented by a one-bit value, a two-bit value, or a three-bit value;

wherein the vector processor is configured to generate the plurality of first precoded data signals for the first tone by also applying a plurality of scaling coefficients to the value being communicated to the data receiver; and wherein at least some of the scaling coefficients are expressed as $2^{-m}$, where m is a respective positive integer.

24. The apparatus of claim 23, wherein the vector processor is configured to apply said at least some of the scaling coefficients to the value using respective bit-shift operations.

25. An apparatus comprising a data receiver that comprises an analog front end and a digital signal processor configured to process digital samples corresponding to a plurality of input signals received by the analog front end at input ports connectable to proximal ends of a corresponding plurality of subscriber lines, the input signals being received in response to data signals applied to distal ends of the subscriber lines, the data signals having been encoded with data using frequency-division multiplexing;

wherein the digital signal processor comprises a vector processor configured to generate, for a first tone, an output value by computing a weighted sum of input values, each of the input values corresponding to the first tone of a respective one of the input signals, the weighted sum being computed using a plurality of weighting factors, the input signals on the first tone thereof being received in response to a single one of the data signals, the single one of the data signals having been coupled to multiple ones of the subscriber lines by way of interline crosstalk on the first tone;

wherein the weighting factors are selected such as to cause addends of the weighted sum to add constructively, each of the weighting factors being represented by a one-bit value, a two-bit value, or a three-bit value;

wherein the vector processor is configured to compute the weighted sum for the first tone by also applying respective scaling coefficients to at least some components of the weighted sum; and wherein at least some of the respective scaling coefficients are expressed as $2^{-m}$, where m is a respective positive integer.

26. The apparatus of claim 25, wherein the vector processor is configured to apply said at least some of the respective scaling coefficients using respective bit-shift operations.

* * * * *